(12) United States Patent
Schwarz

(10) Patent No.: US 11,766,148 B2
(45) Date of Patent: Sep. 26, 2023

(54) DEPOSITING DEVICE FOR CARGO CARRIED BY AN AERIAL VEHICLE

(71) Applicant: Liron Schwarz, Ness Ziona (IL)

(72) Inventor: Liron Schwarz, Ness Ziona (IL)

( * ) Notice: Subject to any disclaimer, the term of this patent is extended or adjusted under 35 U.S.C. 154(b) by 0 days.

(21) Appl. No.: 17/369,141

(22) Filed: Jul. 7, 2021

(65) Prior Publication Data

US 2022/0007871 A1 Jan. 13, 2022

Related U.S. Application Data

(60) Provisional application No. 63/049,701, filed on Jul. 9, 2020.

(51) Int. Cl.
*A47G 29/22* (2006.01)
*A47G 29/30* (2006.01)
*A47G 29/14* (2006.01)
*B64D 9/00* (2006.01)

(52) U.S. Cl.
CPC ......... *A47G 29/22* (2013.01); *A47G 29/141* (2013.01); *A47G 29/30* (2013.01); *B64D 9/00* (2013.01); *A47G 2029/143* (2013.01); *A47G 2029/145* (2013.01); *A47G 2029/146* (2013.01); *A47G 2029/149* (2013.01)

(58) Field of Classification Search
CPC ...... A47G 29/22; A47G 29/141; A47G 29/30; A47G 29/1248; A47G 2029/143; A47G 2029/145; A47G 2029/146; A47G 2029/149; B64D 9/00; B64D 1/02; B64D 1/12; B64C 39/024; B64C 2201/128; G07C 9/00912; B64F 1/32; E05B 65/0075; G06Q 10/08; G06Q 10/0832; G06Q 50/28

USPC .......... 232/19, 45, 38, 47, 48; 340/569; 244/114 R, 118.1, 118.2, 137.1, 137.4; 705/330; 70/159, 63; 200/61.63
See application file for complete search history.

(56) References Cited

U.S. PATENT DOCUMENTS

| 7,854,374 | B2 * | 12/2010 | Dudley | A47G 29/12095 |
| | | | | 232/47 |
| 10,026,054 | B1 * | 7/2018 | Staton | B65D 25/00 |
| 10,093,454 | B1 * | 10/2018 | Kalyan | A47G 29/12 |
| 10,368,676 | B1 * | 8/2019 | Ansari | A47G 29/1248 |
| 10,993,567 | B1 * | 5/2021 | Cabral-McKeand | A47G 29/141 |
| 11,045,031 | B2 * | 6/2021 | Ritchie | G07C 9/00912 |
| 2015/0175276 | A1 * | 6/2015 | Koster | B64F 1/32 |
| | | | | 244/114 R |
| 2015/0183528 | A1 * | 7/2015 | Walsh | A47G 29/14 |
| | | | | 244/114 R |

(Continued)

*Primary Examiner* — William L Miller

(74) *Attorney, Agent, or Firm* — Eva Leah Taksel

(57) ABSTRACT

Disclosed herein a depositing device for a cargo carried out by an unmanned aerial vehicle. The depositing device can comprise a receptacle enclosed from above by one or more swinging ledges forming a cargo-dropping area on the outer surface thereof, wherein the receptacle is coupled to a hanging device adapted for hanging said depositing device to a balcony railing. The depositing device also comprises a transmitter designed to transmit information usable by the unmanned aerial vehicle to determine a spatial position of the cargo-dropping area. The one or more swinging ledges are designed to tilt inwardly into the receptacle in case a force exerted by a weight of the cargo imposed on the cargo-dropping area exceeds a threshold weight, for inserting said cargo into the receptacle.

15 Claims, 22 Drawing Sheets

(56) References Cited

U.S. PATENT DOCUMENTS

| | | | |
|---|---|---|---|
| 2016/0159496 A1* | 6/2016 | O'Toole | B64C 39/024 244/110 E |
| 2017/0106979 A1* | 4/2017 | Seger | B64D 1/12 |
| 2017/0116568 A1* | 4/2017 | Pleis | A47G 29/14 |
| 2019/0266819 A1* | 8/2019 | McHale | G05D 23/1917 |
| 2019/0343317 A1* | 11/2019 | Cantrell | G07C 9/00563 |
| 2020/0048951 A1* | 2/2020 | Herschap | G07C 9/38 |
| 2020/0180880 A1* | 6/2020 | Gil | B64F 1/32 |
| 2020/0231393 A1* | 7/2020 | Mercado | B64F 1/32 |
| 2020/0288895 A1* | 9/2020 | Bennet | B64C 39/024 |
| 2020/0398999 A1* | 12/2020 | Ortiz | G08B 13/06 |
| 2021/0038005 A1* | 2/2021 | Morris | A47G 29/30 |
| 2022/0192406 A1* | 6/2022 | Haley | A47G 29/20 |

\* cited by examiner

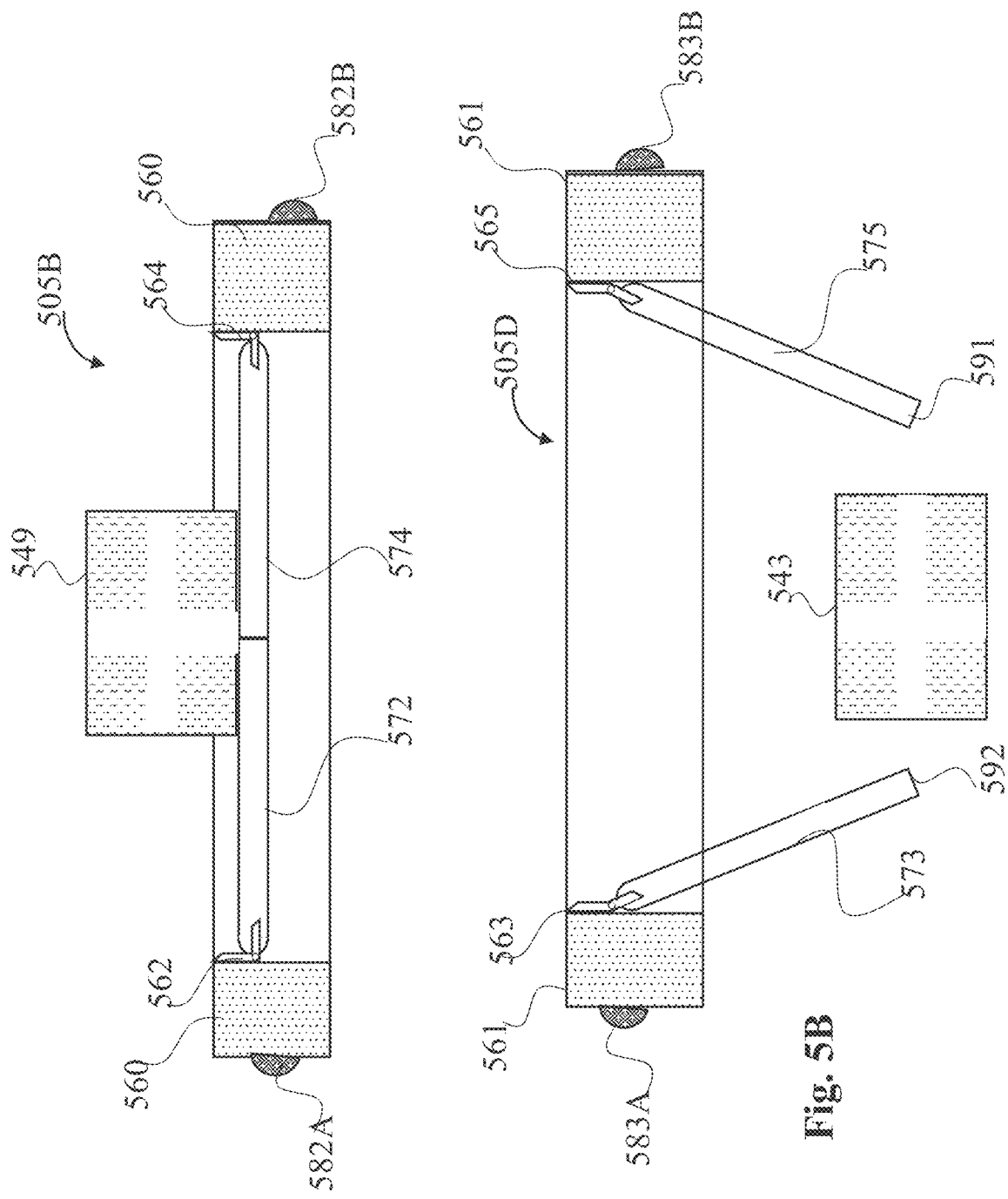

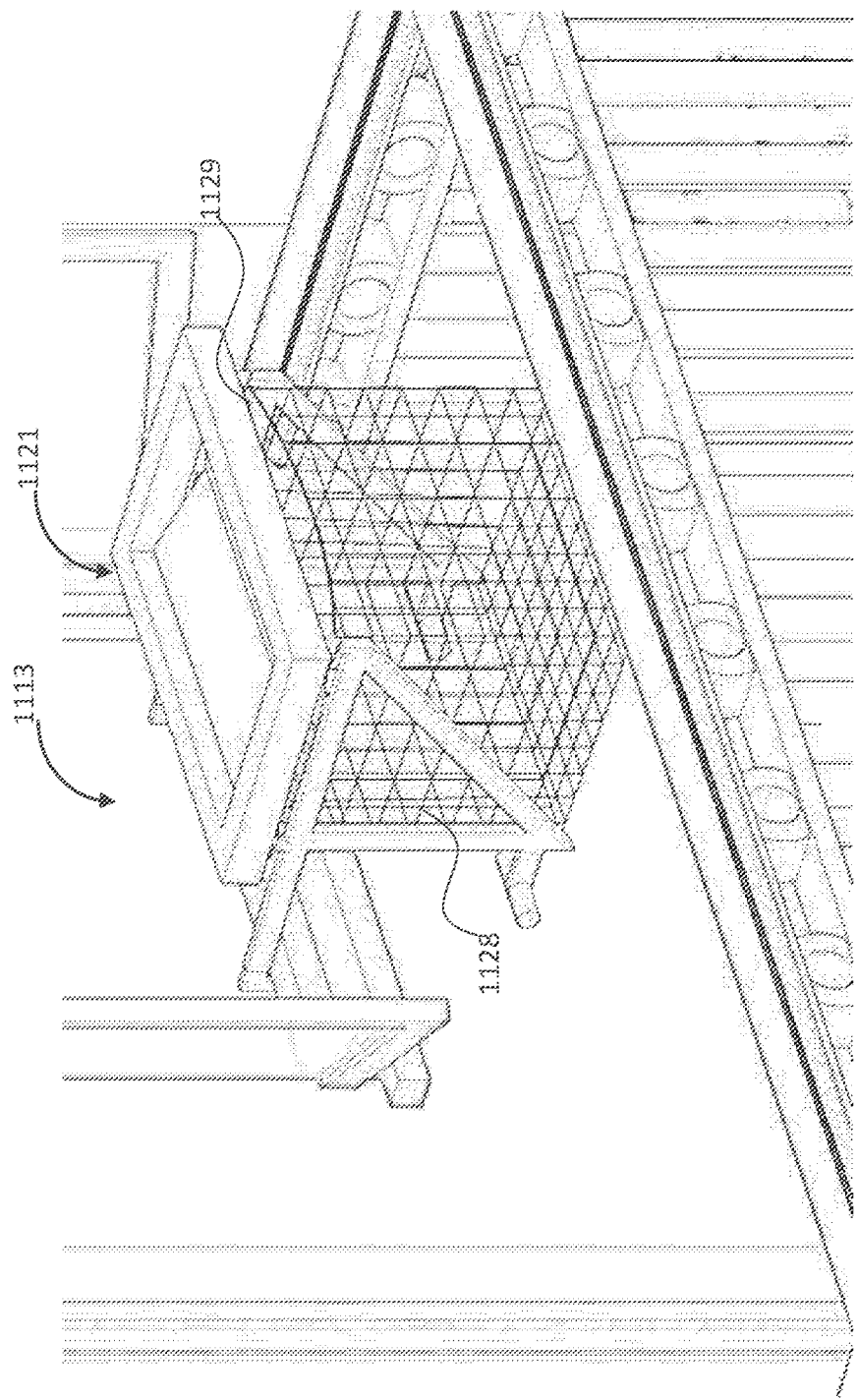

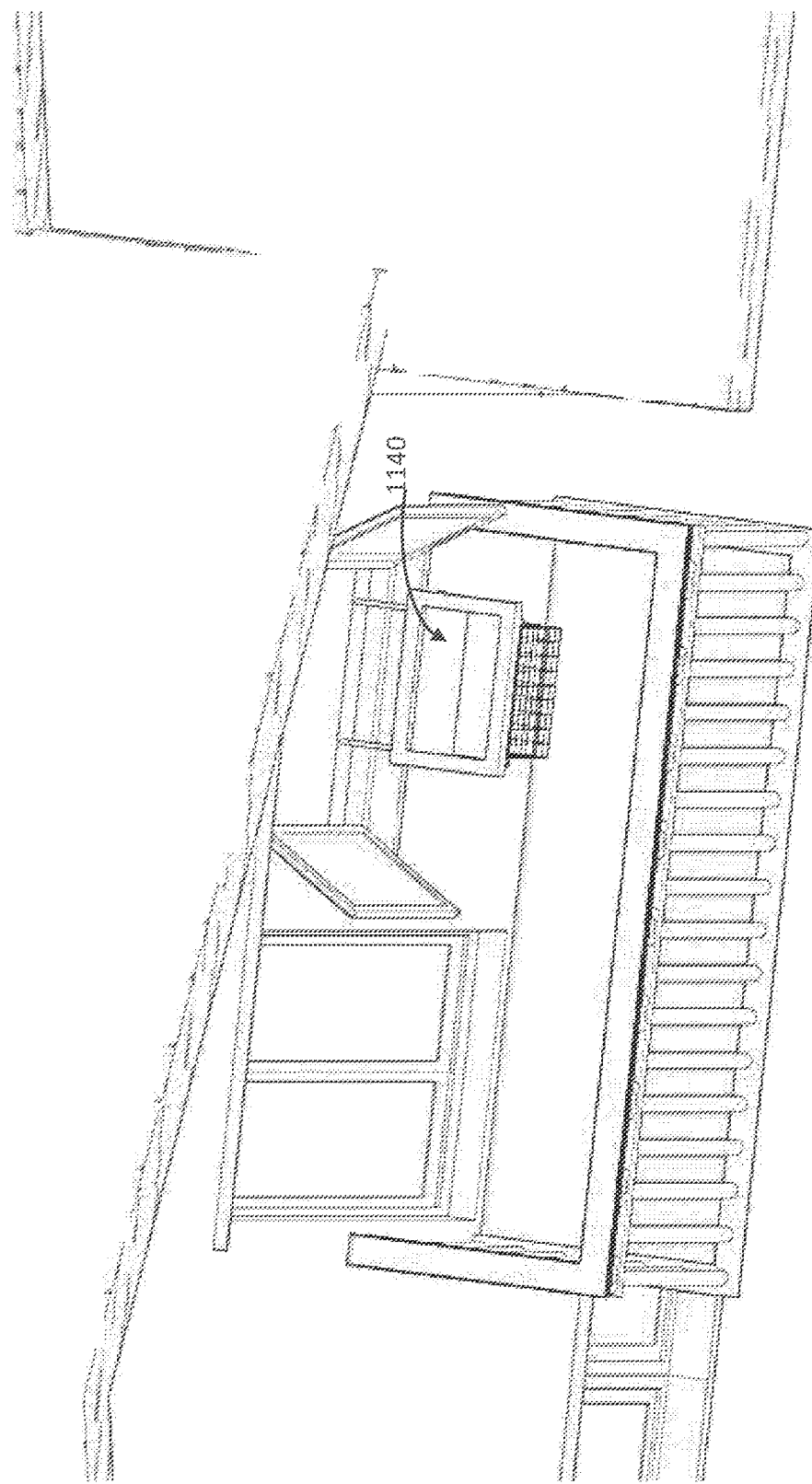

DEPOSITING DEVICE FOR CARGO CARRIED BY AN AERIAL VEHICLE

FIELD OF THE INVENTION

This disclosure relates generally to the field of aviation, and more specifically to devices usable for depositing cargos carried out by aerial vehicles.

BACKGROUND

Utilization of aerial vehicles is gradually permeating an increasing number of aspects of human life. From lightweight UAVs (unmanned aerial vehicles) arriving in open-air to areas which are impenetrable otherwise, via unmanned aerial vehicles that carry out aerial photography missions, up to aerial vehicles delivering cargo and packages while avoiding traffic jams, the utilization of aerial vehicles becomes a usable and simple option.

As of today, this increasing number of aspects of human life pushes the UAVs to be utilized in any populated place, whether it is a hamlet located in the country side, a village, a town or crowded cities characterized in crowded dwelling groups.

One of the main challenges utilizing UAVs and drones appears to be in the way our living environment is structured. Environments consisting crowded roads, buildings and other elements in the urban environment are not designed to accommodate using vehicles operating in a three-dimensional space. Furthermore, our living environment, whether it is a rural settlement in the countryside or a crowded city, has never been designed with drone landing areas, UAV parking areas or any structures facilitating the usage of vehicles operating in the three-dimension, let alone unmanned vehicles.

The utilization of UAV's has a potential to ease simple daily tasks, in which the UAV has the ability to be self-controlled and self-managed and thus perform tasks in a "send and forget" manner.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment a depositing device for a cargo carried out by an unmanned aerial vehicle, comprising: a receptacle comprising a peripheral sidewall extended around a bottom member, said receptacle is enclosed from above by at least one swinging ledge forming a cargo-dropping area on an outer surface thereof, wherein the receptacle is coupled to a hanging device adapted for hanging said depositing device to a balcony railing, wherein, said depositing device is connected with a controller comprising a transmitter and designed to transmit information usable by the unmanned aerial vehicle to determine a spatial position of the cargo-dropping area, and wherein said at least one swinging ledge is designed to tilt downwards into the receptacle for inserting said cargo into the receptacle, in case a force exerted by a weight of the cargo imposed on the cargo-dropping area exceeds a weight-threshold.

In one aspect of the disclosed subject matter, the at least one swinging ledge is configured swing upwards and be situated essentially horizontally to the ground after inserting the cargo into the receptacle.

In one aspect of the disclosed subject matter, the at least one swinging edge is connected to the depositing device by swinging hinges enabling the swing movement downwards and upwards of said at least one swinging edge.

In one aspect of the disclosed subject matter, the depositing device further comprises a lock mechanism designed to prevent said at least one swinging ledge from tilting after one time of tilting downwards thereby prevent inserting further cargo after counting one time of inserting the cargo into the receptacle, wherein the lock mechanism can be reset and restart the counting.

In one aspect of the disclosed subject matter, the depositing device further comprises a weight meter integrated in the bottom member and wherein the lock mechanism configured to prevent the at least one swinging ledge from tilting, in case weight exerted on the bottom member exceeds a weight-threshold value In one aspect of the disclosed subject matter, the ledges are designed to swing downwards in case the force exerted by the cargo on the swinging ledges exceeds a swinging threshold value.

In one aspect of the disclosed subject matter, the device disclosed herein further comprises a frame situated on in a top part of the receptacle, wherein said at least one swinging edge is connected to said frame, and wherein the frame adapted to be used by the unmanned aerial vehicle to land.

In one aspect of the disclosed subject matter, the at least one swinging edge is connected to said frame via swing hinges.

In one aspect of the disclosed subject matter, the frame and at least one of the swinging ledges are creating continuous plane enabling the unmanned aerial vehicle to be positioned in a steady fashion required for detached the cargo.

In one aspect of the disclosed subject matter, the information transmitted by the transmitter further comprises information indicating the identity of the depositing device.

In one aspect of the disclosed subject matter, the transmitter further comprises a receiver designed to validate the identity of the unmanned aerial vehicle.

In one aspect of the disclosed subject matter, the depositing device is identified by the UAV by an ID transmitted to the UAV by the transmitter for the purpose of being identified.

In one aspect of the disclosed subject matter, the transmitted device is also a receiver configured to validate the identity of the UAV.

In one aspect of the disclosed subject matter, the at least one swinging device is locked in case the identity validation of the UAV fails.

In one aspect of the disclosed subject matter, the controller is adapted for receiving authentication requests, thereby based on identify successful validation process conducted by the controller, said controller unlocks the swinging ledges which are locked otherwise.

In one aspect of the disclosed subject matter, the at least one swinging ledge is designed to be in two configuration modes: (i) a first configuration mode wherein at least one of the swinging ledges is locked such that the ability to swing of one of said at least swinging ledges is disabled in case weight exerted on said at least one of the swinging ledges is above a UAV-threshold (ii) a second configuration mode wherein at least one of the swinging ledges is unlocked such that the ability to swing of one of said at least swinging ledges is allowed in case weight exerted on said at least one of the swinging ledges is below a UAV-threshold.

In one aspect of the disclosed subject matter, the swinging are folded upwardly in case a cargo is landed thereon.

In one aspect of the disclosed subject matter the at least one of the swinging ledges comprises solar panels.

In one aspect of the disclosed subject matter, at least one of the solar panels is configured to produce electricity.

In one aspect of the disclosed subject matter, the electricity produced by the at least one of the solar panels are utilized for tilting upward and downward at least of the swinging ledges.

In one aspect of the disclosed subject matter, tilting upwardly and/or downwardly is done by a motor or an engine adapted to tilt the swinging ledges.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale.

The figures are listed below:

FIG. 5B shows two cross-sectional views of a part of a depositing device, in accordance with some exemplary embodiments of the disclosed subject matter;

FIGS. 11A-11E show a depositing device suspended from a window, in accordance with some exemplary embodiments of the disclosed subject matter;

DETAILED DESCRIPTION

Figure 1A:
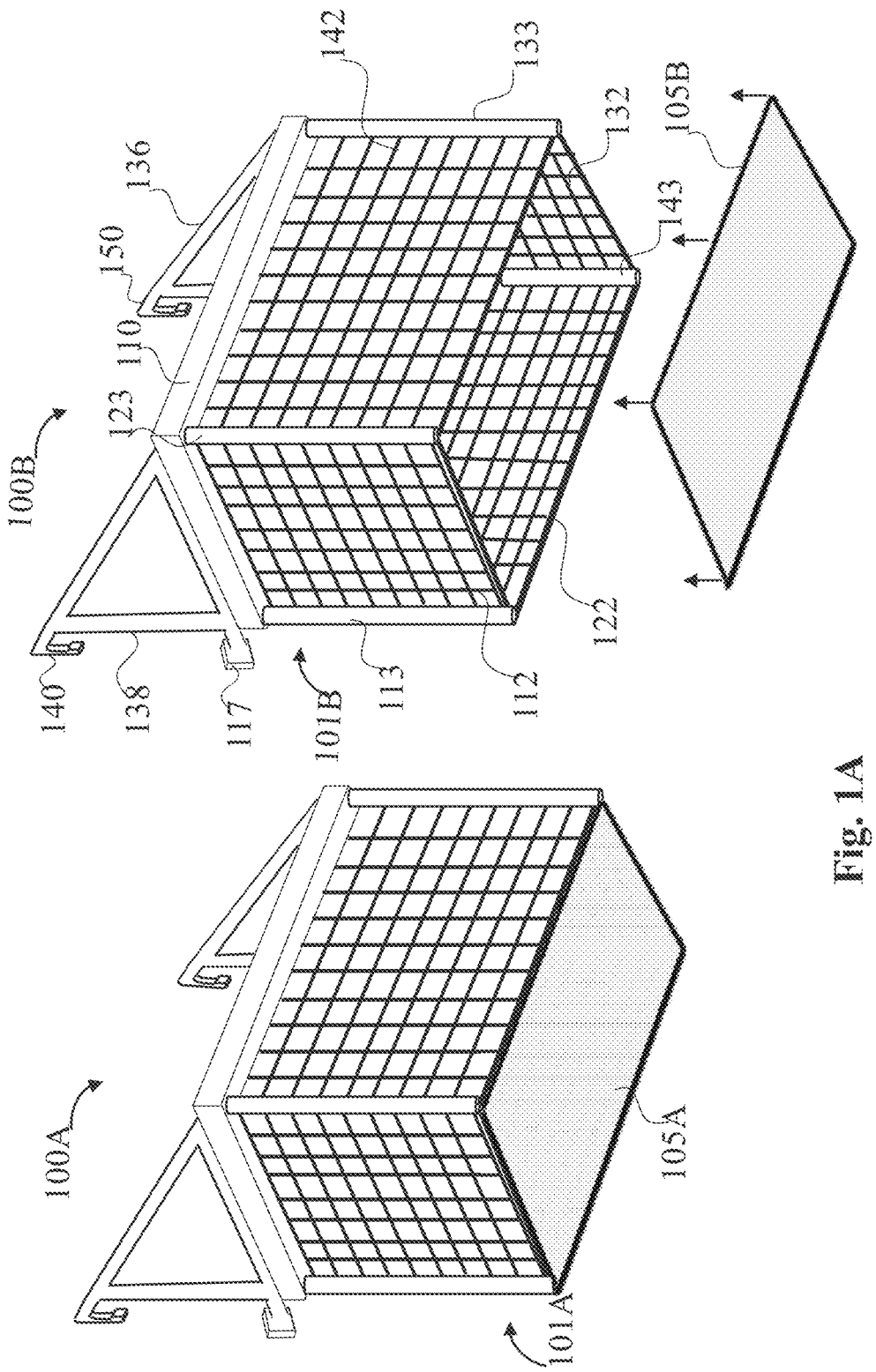
FIG. 1A shows two views of one depositing device, in accordance with some exemplary embodiments of the disclosed subject matter.

Disclosed herein is a depositing device designed to be used by an unmanned aerial vehicle (UAV) for depositing cargos, consisted of a receptacle enclosed from above by one or more swinging ledges functioning as a cargo-dropping area, wherein at least one of the swinging ledges can tilt downwards into the receptacle to allow a cargo imposed thereon to insert into the receptacle.

As used herein the term "Unmanned Aerial Vehicle" (UAV) refers to an aircraft without a human pilot aboard. In some cases, the UAV is also called a drone. The UAV can have an onboard computer for controlling its flight. Alternatively, a pilot, who is placed on the ground or in another vehicle, can remotely control the flight of the UAV. In some embodiments, the UAV is designed to transport cargo, identify a cargo-dropping area and release the cargo thereon. In some embodiments, the UAV referred by the present disclosure can be a delivery drone which in some cases can be an autonomous vehicle, often a UAV used to transport packages, food or other goods.

In some embodiments, the depositing device disclosed herein is a portable device comprising a receptacle enclosed from above with one or more swinging ledges (or doors). In some embodiments, the depositing device can be placed outdoors, or at any location accessible for a UAV from the open air. Exemplary embodiments of the present disclosure are equipped with diverse means and/or mechanisms utilized for situating the depositing device in a steady and firmed fashion enabling a UAV to lay a cargo, e.g., a package, in a safe manner, as elaborated further below.

In some embodiments, the depositing device disclosed herein can be equipped with one or more mechanisms designed to attach the depositing device to a balcony railing such that the receptacle can be hung on the side of the balcony railing facing out of the house (or apartment). In some embodiments, the depositing device is positioned in a manner that allows the UAV to reach from outside of the house, while having the required leeway for navigating to the depositing device and for dropping the cargo in the cargo-dropping area.

In some embodiments, the cargo-dropping area is on the top of one or more swinging ledges enclosing the receptacle of the depositing device from above. Hence, in some embodiments, the swinging ledges have a dual purpose, to form the cargo-dropping area, and to close the receptacle with the cargo within.

Accordingly, in some embodiments, one or more of the swinging ledges forming the cargo-dropping area are situated horizontally relative to the ground such that, the outside of the swinging ledges facing outward from the receptacle, form a flat region functioning as a cargo-dropping area. In exemplary embodiments, a UAV can fly above the depositing device, locate the cargo-dropping, lay thereon the cargo and disconnect therefrom.

Further, in some embodiments, once a cargo is laid on the cargo-dropping area, at least one ledge forming the cargo-dropping area can tilt downwards (as elaborated further below) thereby enabling the cargo to insert into the receptacle. In some embodiments, the tilting of a swinging ledge can be as a result of a force exerted by the weight of the cargo laid on the cargo-dropping area.

In some embodiments, the receptacle of the depositing device disclosed herein can be designed to receive and store the cargo delivered by the UAV. Thus, in some embodiments, such a receptacle comprises a peripheral sidewall extended around a bottom member designed to accept the cargo thereon.

In some embodiments, the present disclosure provides for locating the cargo-dropping area by sending information (e.g., through signaling over wireless communication), which can be received by the UAV. In some embodiments, devices such as transmitters or transmitter-receivers can be used to send information which is interpretable by the UAV and used for navigating to the cargo-dropping area. In some embodiments, the sent information can be used by the UAV to calibrate the UAV spatial location relative to the cargo-dropping area and thus the UAV can navigate and position the carried cargo to be above the cargo-dropping area.

In some embodiments, once the cargo carried by the UAV is above the cargo-dropping area, the cargo can be released and/or be laid on the cargo-dropping area. In some embodiments, the weight of the laid cargo exerts force on one or more swinging ledges forming the cargo-dropping area. In some embodiments, such a force causes the one or more swinging ledges to automatically tilt toward the receptacle thus to slide the cargo into the receptacle.

In some embodiments, once the cargo is located within the receptacle, at least one of the swinging ledges can swing back thereby to close the receptacle. In some embodiments, the one or more ledges swung backwards may be locked automatically to prevent further usage of the depositing device while a cargo, e.g., a package, is located within.

The present disclosure is not limited to the embodiments described above, but it can be realized, modified and indicated in examples described further below.

Reference is made to FIG. 1A showing two views of one depositing device, in accordance with some exemplary embodiments of the disclosed subject matter. FIG. 1A shows a depositing device 100A designed to be suspended from a barrier or a railing. In some embodiments, such a railing can be a balcony railing comprising rails and/or bars from which the depositing device 100A can be suspended.

In some embodiments, the depositing device 100A can be suspended from a barrier, a fence, or a railing, a banister, or the like, comprising one or more rails positioned horizontally or vertically to the ground.

Depositing device 100A comprises a receptacle 101A attached to a bottom member 105A designed to hold the cargo inserted into the receptacle 101A. In some embodiments, the bottom member 105A is a flat plane functioning as the base of the receptacle 101A on which the cargo can be laid.

FIG. 1A also shows a view of depositing device 100B which is another view of depositing device 100A. Depositing device 100B is shown for the sake of clarity and simplification, and provides a different view from the view provided by the view of depositing device 100A. Depositing device 100B comprises a bottom member 105B which can be attached to the receptacle 101B as pointed by the arrows shown in FIG. 1A.

Receptacle 101B comprises sidewall sections 112, 122, 132, and 142 forming one sidewall extending around the bottom member 105B thereby forming the sidewall of the receptacle 101B. In some embodiments, the sidewall sections 112, 122, 132, and 142 are forming one continuous sidewall extending around the bottom member 105B which can be fastened and stabilized by the supporting beams 113, 123, 133, and 143.

In some embodiments, the sidewall formed by the sidewall sections 112, 122, 132 and 142 can be a vertical three-dimension structure enclosing the inner area of the receptacle 101B.

In some embodiments, the sidewall sections 112, 122, 132 and 142 are separated sections fastened independently to the supporting beams 113, 123, 133, and 143. For example, sidewall section 112 can be fastened to the supporting beams 113 and 123, sidewall section 122 can be fastened to the supporting beams 113 and 143, sidewall section 132 can be fastened to the supporting beams 133 and 143, and sidewall section 142 can be fastened to the supporting beams 133 and 123.

In some embodiments, the sidewall sections 112, 122, 132 and 142 are connected to the supporting beams 113, 123, 133, and 143 by one or more connecting means such as magnet, screws, bolts, welds, adhesive material, or a mechanical clip which fastened sidewall sections to the supporting beams and serve to stabilize of the receptacle 101B.

In some embodiments, the sidewall sections 112, 122, 132 and 142 can be structured by multiple cords or rails positioned in lengthwise and crosswise, such as a net e.g., in a crisscross fashion. In some embodiments, the cords of the sidewall sections 112, 122, 132 and 142 can be flexible cords, namely cords which can be easily tilted or twisted by a person, in case which they are not connected to the depositing device 100B.

In some embodiments, the sidewall sections 112, 122, 132 and 142 can be made of cords, ropes, strings, or any strand twisting together fibers such as hemp or artificial fibers, e.g., polypropylene. In such embodiments, the cords extending lengthwise are extended from one supporting beam to another. Thus, the cords extended crosswise can extend from a frame 110 to the last cord extended crosswise in the sidewall.

Further, in some embodiments, the sidewall sections 112, 122, 132 and 142 are provided in a net-like structure which allows for vision through it. In some embodiments, the net-like structure is used to see whether a package is resided within the receptacle 101B.

In some embodiments, the locking module 1030 is used to prevent at least one swinging ledge from tilting after one time of tilting inwardly downwards thereby prevent inserting further cargo after one time of inserting the cargo into the receptacle, wherein the lock mechanism can be reset and restart the counting.

In some embodiments, the sidewall sections 112, 122, 132 and 142 can be made of material which is impermeable to water. In some embodiments, sidewall sections 112, 122, 132 and 142 can be attached by a water impermeable means, e.g., welded or by adhesive material, in a fashion forming the receptacle 101B an impermeable device.

In some embodiments, such an impermeable material is transparent or semitransparent to visible light such that a package, or at least the outlines of a package, residing within the receptacle 101B is seen by a person. In some embodiments, such a material can be opaque such that a package residing within the receptacle 101B is not seen by a person.

In some embodiments, the receptacle 101B may not have supporting beams such as supporting beams 113, 123, 133, and 143. In such embodiments, the sidewall sections 112, 122, 132 and 142 can be made of a material providing the stability required for the receptacle 101B to be a stable structure designed to carry stably the weight of the depositing device 100B and also the weight of the cargo (not shown).

Depositing device 100B also comprises hanging structures 136 and 138 adapted to hang the receptacle 101B to rails or beams such as in a balcony railing. In some embodiments, the hanging structures 136 and 138 are positioned above the receptacle 101B wherein the receptacle 101B is extended downwardly below the hanging structures 136 and 138.

The hanging structures 136 and 138 can be provided in diverse geometries and structure shapes allowing both, holding the receptacle 101B hung, and fastening to rails or beams in a steady fashion. Such a steady fashion may allow the UAV delivering the cargo to navigate to the depositing device 100B, determine the location of the cargo-dropping area (not shown) and lay the cargo thereon.

The hanging structures 136 and 138 are also connected to frame 110. In some embodiments, frame 110 can be fastened to the receptacle 101B for dual purposes, one purpose can be to carry the receptacle 101B and one purpose to provide the UAV a landing place while depositing the cargo, as elaborated further below.

The hanging structures 136 and 138 comprise fasteners 140 and 150 respectively, allowing to hang the depositing device 100B. Exemplary embodiments employ diverse fastener types comprising clamps, hooks, pins, and/or hasps for the purpose of fastening the hanging structures 136 and 138 to a rail, beam, pole, pillar, or a column.

Figure 1B:
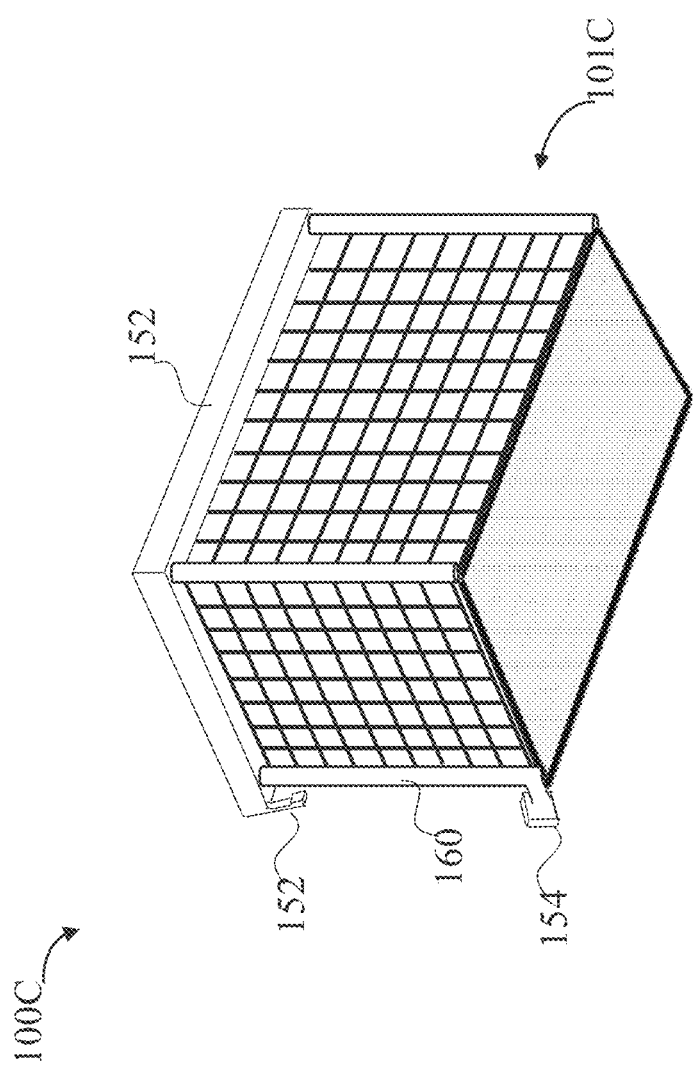
FIG. 1B shows a depositing device, in accordance with some exemplary embodiments of the disclosed subject matter.

In some embodiments, the hanging structures 136 and 138 comprise props used to support the hung depositing device 100B in a steady position. FIG. 1 shows the prop 117 coupled to the hanging structures 138 while the prop coupled to the hanging structures 136 is not shown due to isometric constraints of the drawing shown in FIG. 1.

Figure 12A:
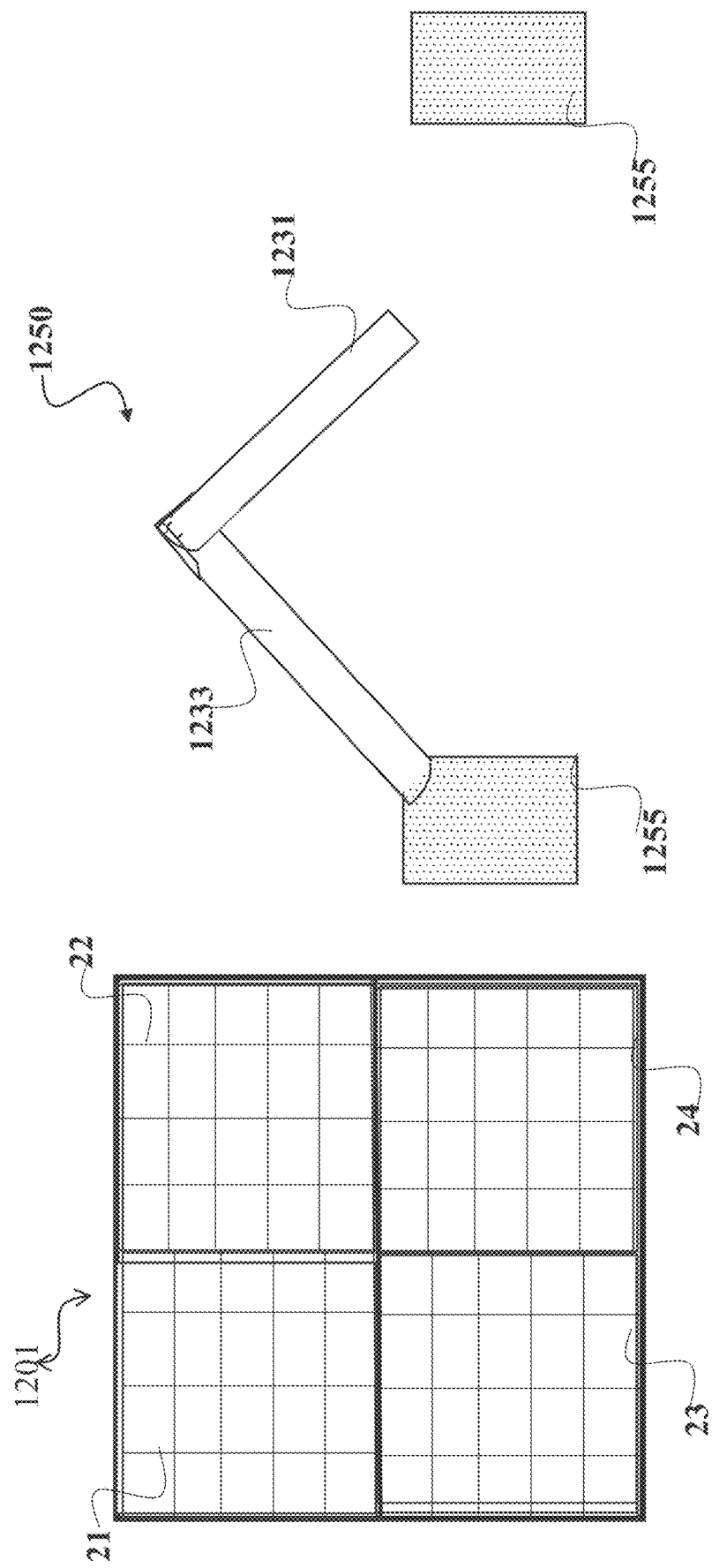
FIGS. 12A-12B schematically depict cargo-dropping area covered with solar panels, in accordance with some exemplary embodiments of the disclosed subject matter.

The cargo-dropping area 1201 comprises PV panels PV panel 23, panel 22, panel 23, and panel 24, each of which comprises multiple photo voltaic cells. FIG. 12A also shows also shows a cross-sectional view of frame 1255 with swinging ledges 1233 and 1231 connected thereto. In some embodiments, the swinging ledges 1233 and 1231 can tilt upwardly and thereby to allow a cargo to enter into the deposit device (not shown).

In some embodiments, the swinging ledges 1233 and 1231 is configured to convert solar light or electrical light to electricity. In some embodiments, this electricity can be used to activate the swinging ledges 1233 and 1231 upwardly. In some embodiments, an engine or a motor for tilting the swinging ledges 1233 and 1231 upwardly.

Figure 12B:
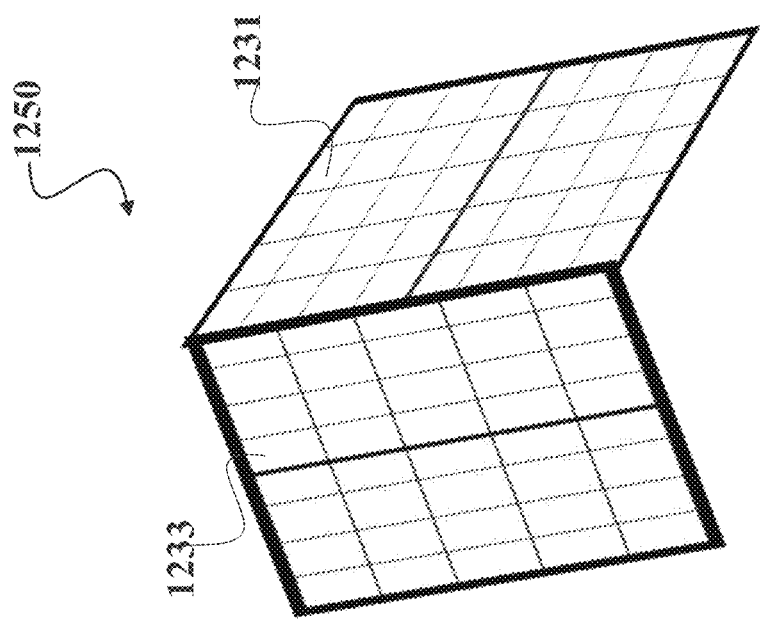

FIG. 12B shows cargo-dropping area 1250 comprising swinging ledges 1233 and 1231 and designed to tilt up, as aforementioned. In some embodiments, at least one of the swinging ledges 1233 and 1231 comprises a sensor adapted to measure the weight on the top of the at least one of the swinging ledges 1233 and 1231 and upon detecting weigh, to utilize a motor (not shown) for tilting as aforementioned for the purpose of tilting the cargo-dropping area 1250.

Figure 1C:
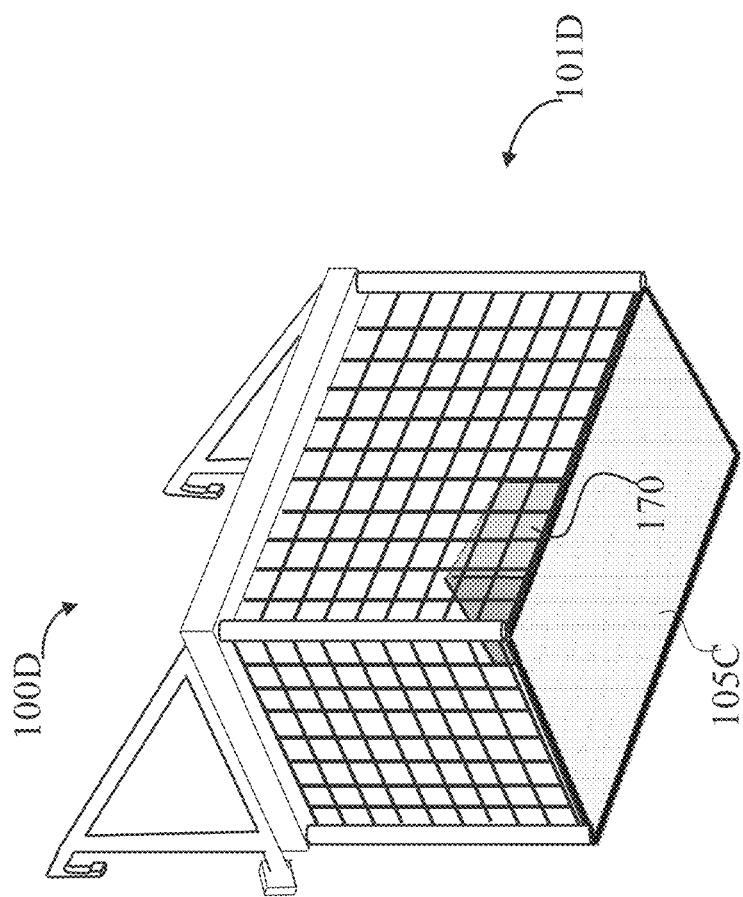
FIG. 1C showing a depositing device with a cargo within, in accordance with some exemplary embodiments of the disclosed subject matter.

Reference is made to FIG. 1C showing a depositing device with a cargo within, in accordance with some exemplary embodiments of the disclosed subject matter. FIG. 1C shows a depositing device 100D comprising a receptacle 101D and bottom member 105C. FIG. 1C also shows a cargo 170 located within the receptacle 101D of depositing device 100D and laid on bottom member 105C.

Figure 2:
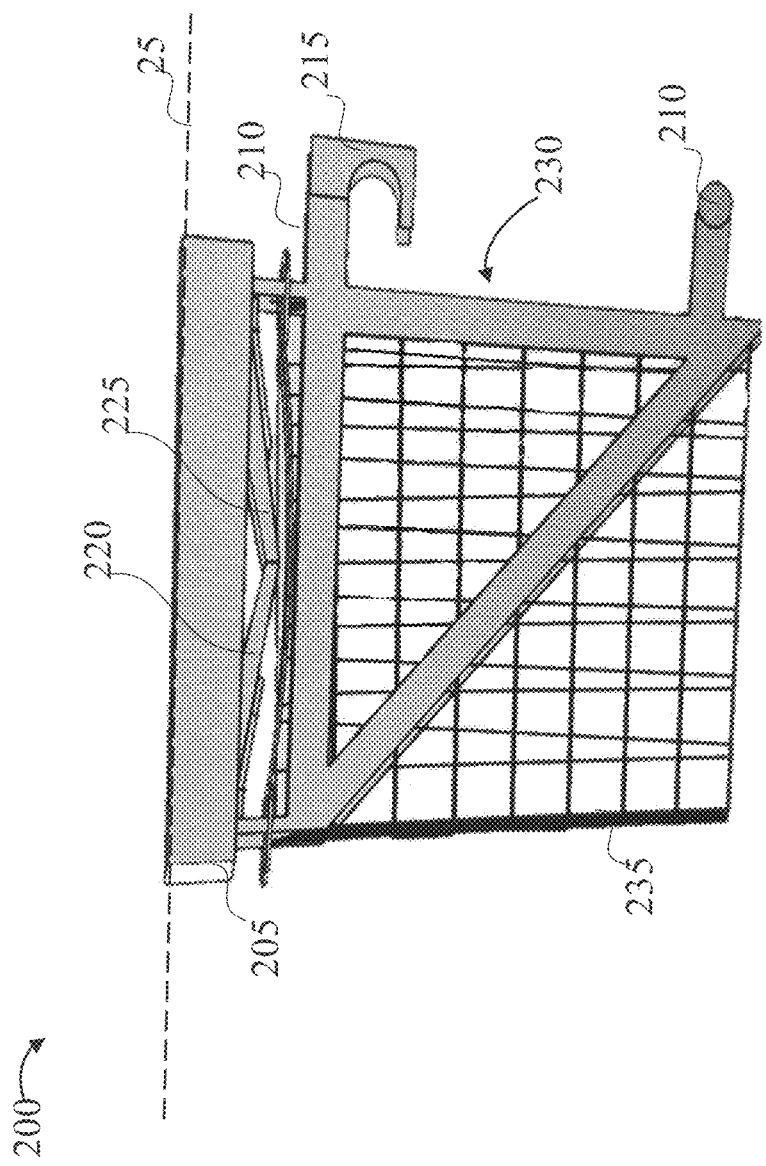
FIG. 2 shows a lateral schematic view of a depositing device, in accordance with some exemplary embodiments of the disclosed subject matter.

Reference is made to FIG. 2 showing a lateral schematic view of a depositing device, in accordance with some exemplary embodiments of the disclosed subject matter. FIG. 2 shows a lateral schematic view of depositing device 200 comprising hanging device 230, receptacle 235 and a frame 205. The hanging device 230 is designed to be situated underneath the depositing device upper outline, namely below the frame 205. The hanging device 230 is adapted to be connected to the frame 205 and extend beneath in a way which holds and supports the receptacle 235. In some embodiments, positioning the hanging devices such as hanging device 230 underneath the depositing device upper outline, marked by axis 25, allows UAV's to land on the top of the depositing device 200 while the upper space above the frame 205 remains free and open for navigating and landing activities.

Hanging device 230 also comprises a hook 215 designed to be utilized to hang the depositing device 200, as aforementioned, thereby carry the weight of the hung depositing device 200. Hanging device 230 also comprises a prop 210 to support the hung depositing device 200 pushed against the rail by the force resulting from the weight of the hung depositing device 200. In some embodiments, the prop 210 comprises one or more additional clamps, hooks, pins, and/or hasps for the purpose of fastening the hanging device 230 to the railing and further stabilize the depositing device 200.

Depositing device 200 demonstrates one possible embodiment wherein the swinging ledges 220 and 225 are connected to the frame 205. In some embodiments, the frame 205 also function as a stopper which prevents the swinging ledges 220 and 225 from swinging further above the upper outline of the receptacle 235 depicted by the axis 25.

Figure 3A:
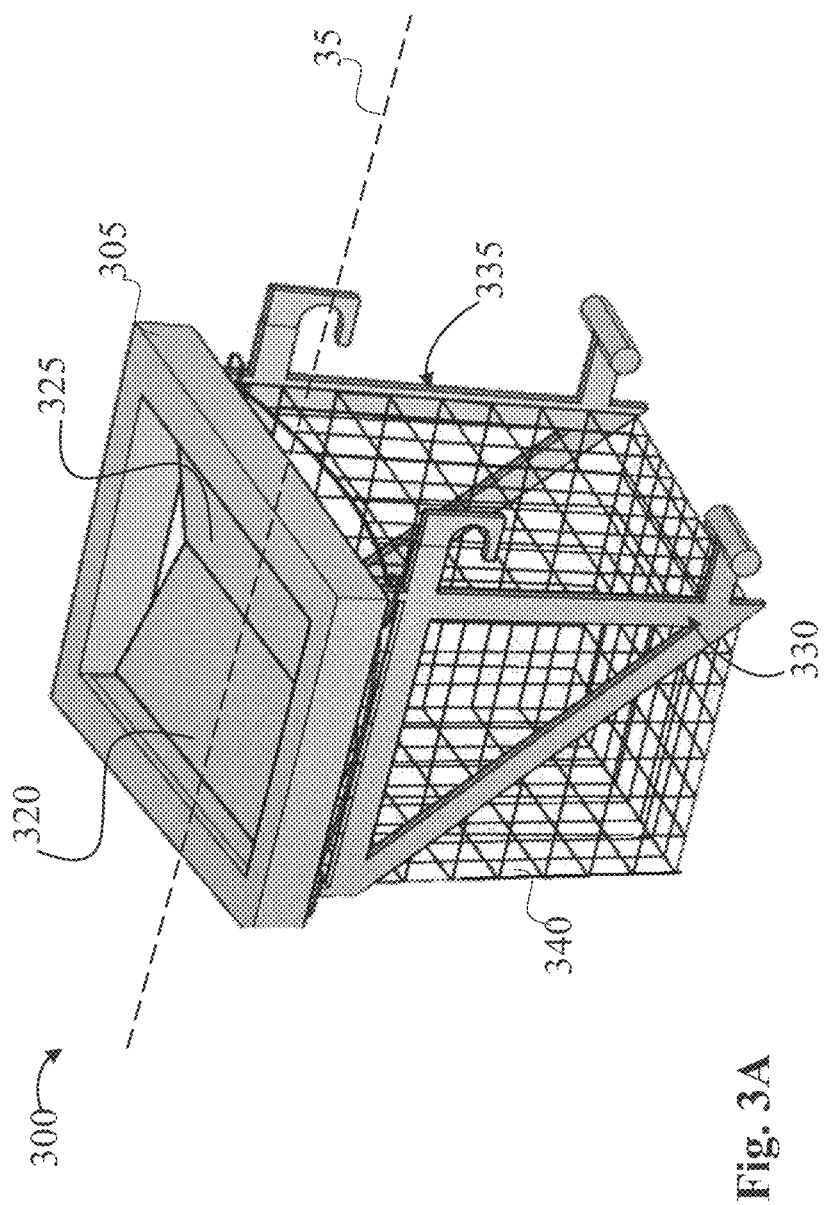
FIG. 3A shows a view of a depositing device, in accordance with some exemplary embodiments of the disclosed subject matter.

Reference is made to FIG. 3A showing a view of a depositing device, in accordance with some exemplary embodiments of the disclosed subject matter. FIG. 3A shows a lateral schematic view of depositing device 300 comprising swinging ledges 320 and 325 designed to tilt into the space of receptacle 340. Depositing device 300 also comprises hanging device 330 and hanging device 335 situated underneath the upper outline of depositing 300 device. The depositing 300 device upper outline in FIG. 3A is shown by the frame 305 situated on the top of the receptacle 340 and below axis 35.

The hanging devices 330 and 335 are connected to the frame 305 and extend beneath in a way which holds the receptacle 340. In some embodiments, the hanging devices 330 and 335 are connected to the receptacle 340 for maintaining the position of the receptacle 340 in a steady and firm fashion. In some embodiments, the connection between the receptacle 340 and the hanging devices 330 and 335 are done by one or more connecting means such as magnet, screws, bolts, welds, adhesive material, or a mechanical clip which fastened the sidewalls of receptacle 340 to the hanging devices 330 and 335 thereby facilitate the stability of the receptacle 340.

The position of the hanging devices 330 and 335 extending underneath the frame 305 enables frame 305 to function as the rim of depositing device 300. In some embodiments, the frame 305 serves to strengthen of the structure of the depositing device 300 comprising the receptacle 340, and the hanging devices 330 and 335.

In some embodiments, the frame 305 can be used by the UAV's to land. Thus, the hanging structures 330 and 335 are provided in a shape which does not interfere the UAV and the components thereof in the operations required for landing. For example, the positions of hanging structures 330 and 335 underneath the frame 305 create the required leeway to the UAV to navigate, and land on the top of the frame 305.

Figure 3B:
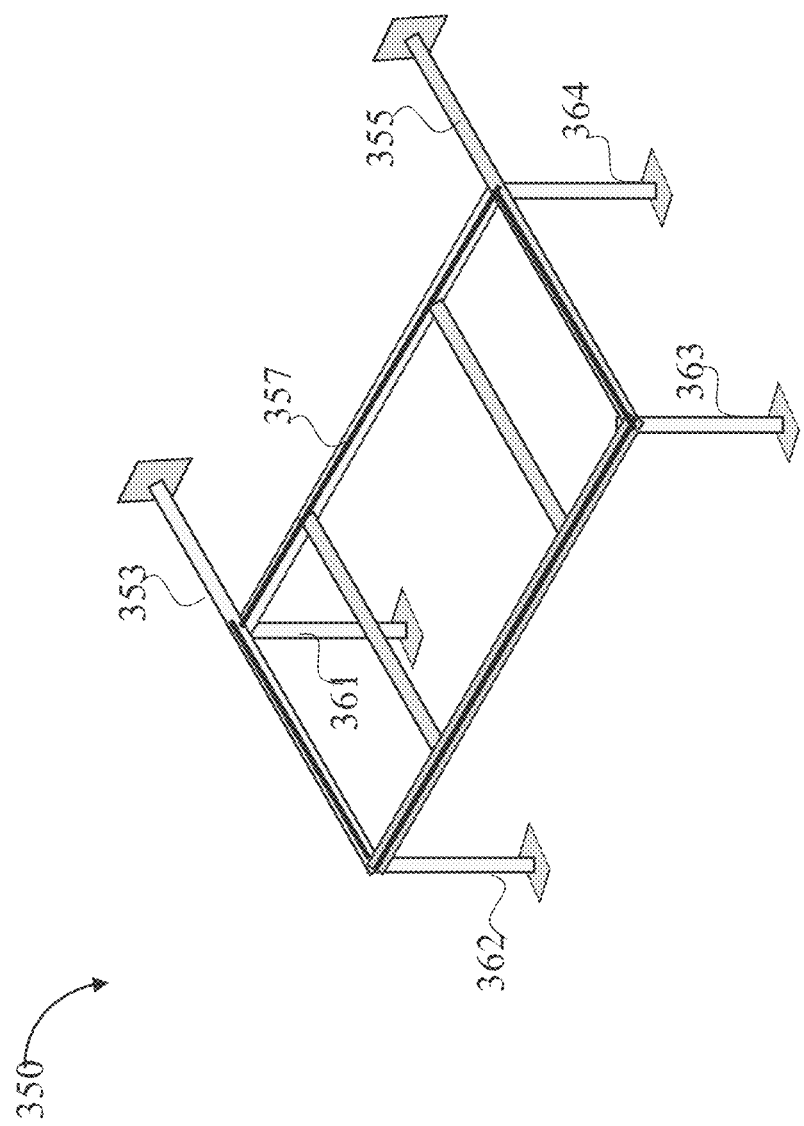
FIG. 3B shows a hanging device for a depositing device, according to some exemplary embodiments of the disclosed subject matter.

Reference is made to FIG. 3B showing a hanging device for a depositing device, in accordance with some exemplary embodiments of the disclosed subject matter. FIG. 3B shows a hanging device 350 comprising hanging arms 353 and 355. In some embodiments, the hanging arms 353 and 355 can be connected to a wall thus serving the stability of the hanging device 350.

In some embodiments, the hanging arms 353 and 355 can replace the hanging structures, e.g., hanging structures 138 and 136. In some embodiments, the hanging device 350 is structured such that a depositing device, e.g., a depositing device 100C, can be placed on the top of the hanging device 350 marked by frame 357. In some embodiments, a bottom member, e.g., bottom member 105A can be placed on the frame 357.

In some embodiments, the hanging device 350 comprises device legs 361, 362, 363, and 364 designed to stand on a flat area, on a solid place, or on the ground. In some embodiments, the hanging device 350 and the depositing device thereon (not shown) are positioned at the stability required for UAV's to land and/or deposit the cargo.

Figure 4:
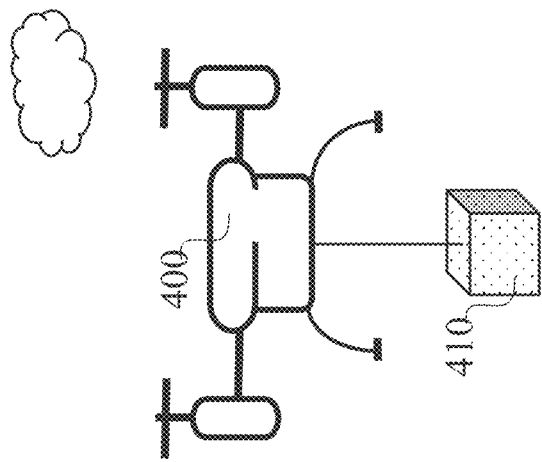
FIG. 4 schematically depicts a hung depositing device and a UAV with a cargo, according to some exemplary embodiments of the disclosed subject matter.
Figure 4:
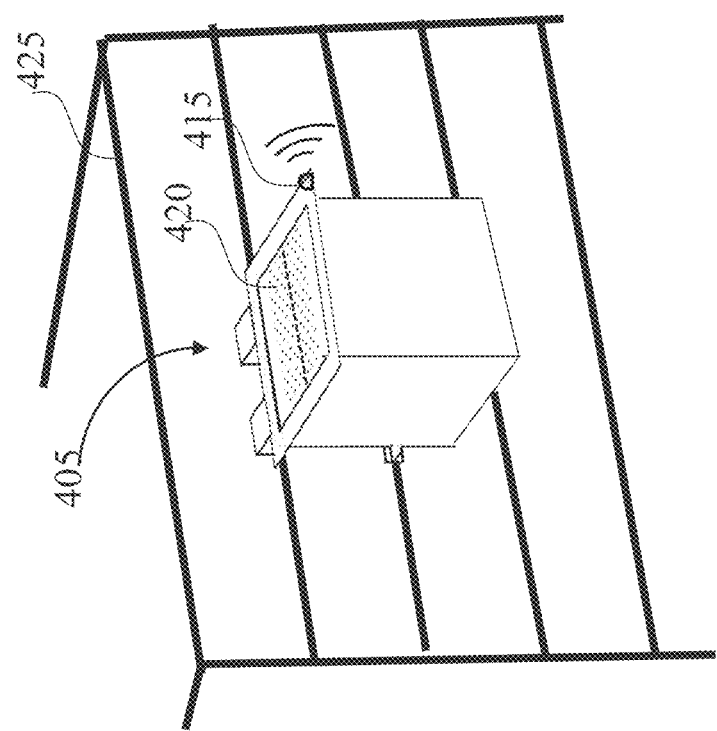

Reference is made to FIG. 4 schematically depicting a hung depositing device and a UAV with a cargo, in accordance with some exemplary embodiments of the disclosed subject matter. FIG. 4 shows a depositing device 405 suspended from the balcony railing 425.

In some embodiments, the balcony railing 425 can partition between the space outdoors and the space belonging to the structure used for habitation, e.g., a house or a flat. In some embodiments, the space belonging to the structure used for habitation can be a balcony, porch, verandah, or a habitation area ending in a window.

In some embodiments, the depositing device 405 disclosed herein is a portable device which can be placed outdoors, or in any location accessible for a UAV from the open air. Exemplary embodiments of the present disclosure are equipped with diverse means and/or mechanisms utilized for situating the depositing device 405 in a steady and firmed fashion enabling a UAV to deposit a cargo in a safe manner. In some embodiments, the depositing device 405 can comprise a handle, or a grip (not shown) for carrying the depositing device 405 by a person.

In some embodiments, the depositing device 405 can be a foldable device which can collapse to a flat and narrow device, e.g., with hinges in the frame (FIG. 3A, frame 305).

The depositing device 405 comprises a cargo-dropping area 420, formed of swinging ledges 430 and 430, which can be used as a cargo-dropping area, for laying the cargo. The depositing device 405 also comprises a transmitting device 415 designed to send information which can be received, interpreted and used by the UAV 400 to determine the location of the cargo-dropping area 420.

In some embodiments, the transmitting device 415 can be located at any place on the depositing device 405. In some embodiments, the transmitting device 415 can be detached from the depositing device 405 and located in a distance from the depositing device 405. In some embodiments, the transmitting device 415 can be coupled with a control device conveying the power to the transmitting device 415. For example, in some embodiments, such a control device can be an integrated circuit, e.g., a field-programmable gate array (FPGA), with a power source, e.g., a battery, and a set of electronic circuits required for the operation of the transmitting device 415.

In some embodiments, the transmitting device 415 can be a wireless (e.g., radio) transmitter capable to transfer information over wireless connections to portable devices, such as UAV 400. In some embodiments, the wireless communication operated by the transmitting device 415 can be through one or more technologies selected from a family of wireless networking technologies based on the IEEE 802.11 also known as W-Fi, a Bluetooth, an Infrared, and the like.

In some embodiments, the information transferred by the transmitting device 415 is adapted to transmit signals which can be utilized by the UAV 400 to determine the location of the depositing device 405 and/or the cargo-dropping area 420. Exemplary embodiments utilize diverse methods such as beaconing methods to transmit a modulated of wireless based beacon, e.g. infrared beacon, which can be identified the UAV 400. The present disclosure provides for utilizing a variety of methods based on one or more technologies such as Bluetooth, Bluetooth Low Energy, or any wireless-based Personal Area Network, for transferring information to the UAV 400.

In some embodiments, the transmitting device 415 may also comprise a receiver, which is, in some cases, designed as a transmitter-receiver (also known as transceiver) for the purpose of receiving information from the UAV 400.

Further, in some embodiments, the transmitting device 415 can be configured to exchange information with the UAV 400 for the purpose of authentication. In such configuration the transmitting device 415 can be programed or configured to validate the identity of the UAV 400. In possible embodiments, the UAV 400 may also be programed or configured to validate the identity of the depositing device 405.

In some embodiments, the UAV 400 and the transmitting device 415 can exchange information for purpose of validating the identities of each other. The present disclosure provides for utilizing a plurality of identification and authentication methods which can be based on a code, a key, or any digital means appreciated by a person having ordinary skills in the art for validating identities and/or establish an authentication process based on wireless communication.

In some embodiments, the present disclosure provides for locking the swinging ledges 430 and 430 in case the transmitting device 415 fails to validate the identity of the UAV 400. For example, in case the identity the of the UAV 400 is validated in the authentication process as aforementioned, the transmitting device 415 can operate a lock mechanism which prevents executions of open state (as defined further below) by the swinging ledges 430 and 430. Such a locking mechanism can be a mechanic gear preventing the swinging ledges 430 and 430 from tilting.

In some embodiments, the transmitting device 415 is configured to send identity which can be utilized by the UAV 400 to distinguish the depositing device 405 from other depositing devices located at the same area, i.e., in the same building. In some embodiments, such identity utilizes location information utilized by the UAV 400 to navigate in area in which multiple depositing devices are located, identify the depositing device 405 among the other multiple depositing devices and land the cargo on the top of the cargo-dropping area 420.

In some embodiments, the transmitting device 415 is configured to send multiple radio signals which can be used by the UAV 400 to calculate distance differences by measurement of times of arrival of signals from one transmitting device 415 to the UAV 400.

In some embodiments, the transmitting device 415 is configured to employ a radio beacon (also known as electromagnetic beacon) capable of marking a fixed location and allows direction-finding equipment to find the cargo-dropping area 420.

In some embodiments, the transmitting device 415 is configured to use angular directions, e.g. by bearing, radio phases or interferometry for the purpose of providing the In some embodiments, exemplary locking mechanisms can be based on battery or any other portable power source which can lock the swinging ledges 430 and 430, or the hinges thereof.

In some embodiments, the transmitting device 415 can be controlled by the transmitting-receiving controller (such as transmitting-receiving controller 1050 elaborated further below) for the purposes of sending the information to the UAV 400, and for operating the identification and authentication methods. In some embodiments, the transmitting-receiving controller is designed to operate the locking mechanism of the swinging ledges 430 and 430. In some embodiments, such a locking mechanism is utilized to lock the swinging ledges 430 and 430 in cases wherein the authentication method failed. In some embodiments, the locking mechanism can lock the swinging ledges 430 and 430 in case the weight of a cargo within the depositing device 405 is over a swinging-threshold.

In some embodiments, the said transmitter is connected to a controller, such as the transmitting-receiving controller 1050, adapted for receiving authentication requests, thereby based on identify successful validation process conducted by the controller, the controller unlocks the swinging ledges which are locked otherwise.

In some embodiments, the UAV 400 may conduct a transmitting device detection processes for detecting and establish a communication between the UAV 400 and the transmitting device 415. In some embodiments, once the transmitting device 415 is detected, an identity validation process can be initiated for validating the identity of the transmitting device 415 by the UAV 400, and/or for validating the identity of the UAV 400 by the transmitting device 415.

In some embodiments, the transmitting device 415 can send to the UAV 400, information comprising details related to the spatial position of the cargo-dropping area 420. In some embodiments, the transmitting device 415 can send to the UAV 400, information comprising details related to the spatial position of the transmitting device 415.

In some embodiments, the spatial position of the cargo-dropping area 420 can be determine the UAV 400 according to spatial position of the transmitting device 415. Accordingly, in some embodiments, the transmitting device 415 can be located in a predefined distance and azimuth from the cargo-dropping area 420.

In some other possible embodiments, the transmitting device 415 can transfer to the UAV 400 some information comprising the spatial position of cargo-dropping area 420 relative to the transmitting device 415. In some embodiments, such a spatial position of the cargo-dropping area 420 can be defined in a two-dimensional manner, e.g., with distance and an azimuth angle to the transmitting device 415. In some exemplary cases, the azimuth can be directed to the center of the cargo-dropping area 420, or to any one of the edges of the cargo-dropping area 420.

In some embodiments, the UAV 400 can determine the spatial position of the transmitting device 415, thereby determine the spatial position of the cargo-dropping area 420.

In some embodiments, the UAV 400 can determine the spatial position the cargo-dropping area 420 in a three-dimensional manner relative to the UAV 400. For example, the transmitting device 415 can transfer the cargo-dropping area 420 spatial position in respect to its direction, e.g., azimuth, and a spatial three-axis position defining the length, width, and height of between the transmitting device 415 and the cargo-dropping area 420. In such exemplary embodiments, the UAV 400 can use the received information to determine its spatial position relative to the cargo-dropping area 420 spatial position.

In some embodiments, in case the spatial position of the cargo-dropping area 420 is determined by the UAV 400, the UAV 400 can calibrate its spatial position with the spatial position of the cargo-dropping area 420 for the purpose of reaching the cargo-dropping area 420 and lay the cargo thereon.

In some embodiments, the UAV 400 may employ diverse techniques from the field of spatial analysis, to analyze the received information and determine the spatial location of the cargo-dropping area 420. In some embodiments, once the information comprising the spatial position of the cargo-dropping area 420 relative to the transmitting device 415 is received by the UAV 400, the UAV 400 can utilize or conclude the final position of the cargo-dropping area 420 by using an imaging device configured to capture an image, a sequence of images, and/or a video stream image, of at least part of the space in which the UAV 400 is flying.

Figure 5A:
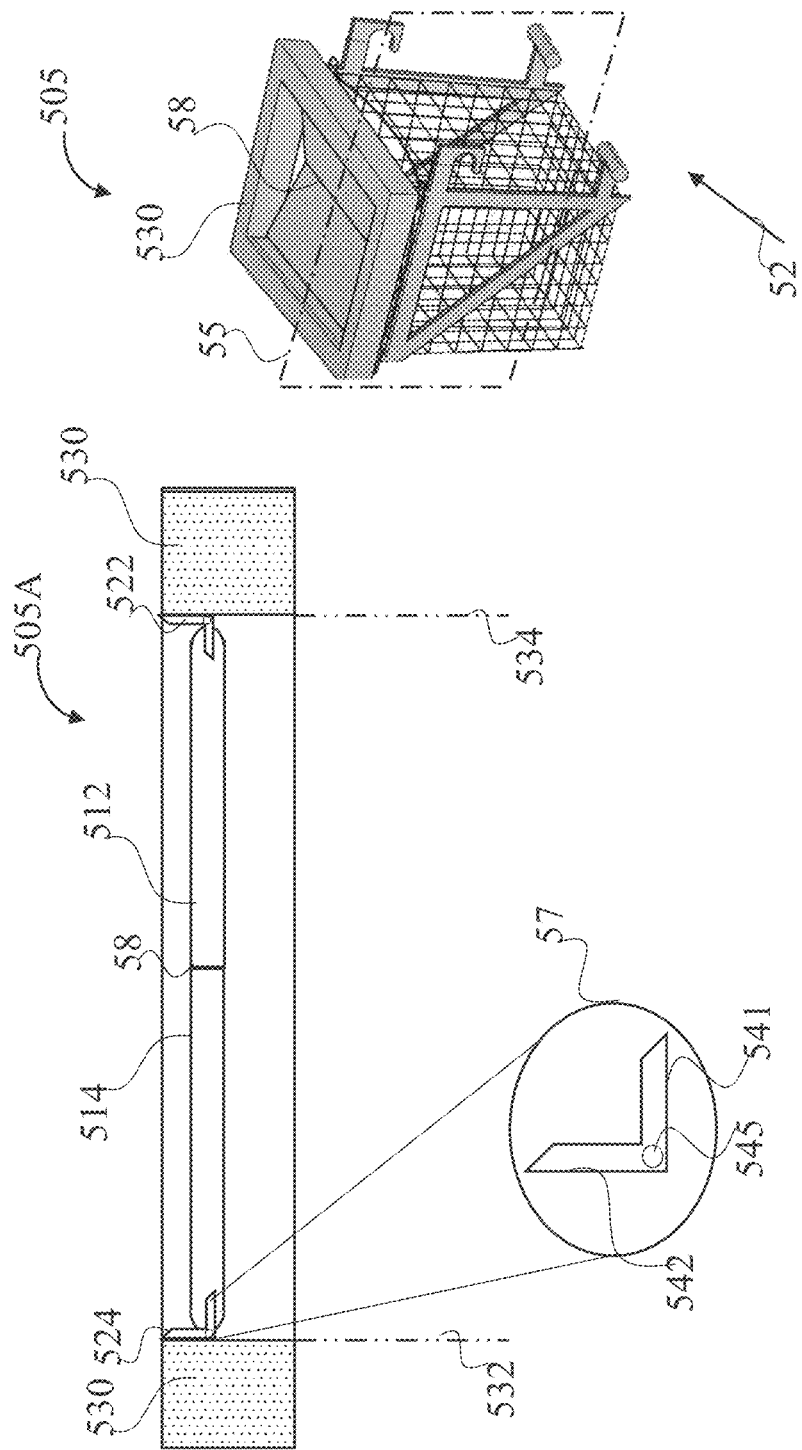
FIG. 5A shows a lateral cross-sectional view of a part of a depositing device, in accordance with some exemplary embodiments of the disclosed subject matter.

Reference is made to FIG. 5A showing a lateral cross-sectional view of a part of a depositing device, in accordance with some exemplary embodiments of the disclosed subject matter. FIG. 5A shows a cross-sectional view 505A of frame 530 comprising swinging ledges 514 and 512 of the depositing device 505. The cross-sectional view 505A is provided according to the imaginary cut line 55 where the sight is according to the direction pointed by arrow 52.

As shown in FIG. 5A, the swinging ledge 514 is connected to the frame 530 by a swinging hinge 524, and the swinging ledge 512 is connected to the frame 530 by a swinging hinge 522. In some embodiments, the swinging ledge 514 is connected to the opposite side of frame 530, to which the swinging ledge 512 is connected, such that the cross-section line described by line 55 is essentially vertical to the encounter line 58 of the two swinging ledges 514 and 512.

In some other possible embodiments, the two swinging ledges 514 and 512 can be connected to frame 530 such that the cross-section line described by line 55 is essentially parallel to the encounter line 58 of the two swinging ledges 514 and 512 (as elaborated further below).

FIG. 5A also shows a magnified view 57 of the swinging hinge 524 providing the capability of swinging to the swinging ledge 514. Swinging hinge 524 comprises a first leaf 541 typically connected to the swinging ledge and a second leaf 542 typically connected to the frame, or to the receptacle (not shown). Swinging hinge 524 also comprises a spring 545 which executes a closing action (namely to return to a "close state" as elaborated further below) in case the swinging ledge 514 is tilted downwardly, after sliding the delivery to the receptacle.

In some embodiments, the swinging hinges 524 and 522, and the components thereof enable the swinging ledges 514 and 512 to be in a "close state" which is a state wherein one or more ledges are situated essentially horizontally to the ground and perpendicularly to the frame 530 or to the sidewall (not shown), wherein the boundaries of the sidewall are marked by axis 532 and axis 534.

In some embodiments, the swinging hinges 524 and 522 and the components thereof enable the swinging ledges 514 and 512 to be in a "open state" which is a state wherein one or more ledges are tilted downwardly. In some embodiments, the open state may be required for inserting a cargo into the receptacle (not shown). In some embodiments, such a tilt is allowed by the rotation of one or more swinging ledges about the swinging hinge thereof.

In some embodiments, the swinging ledges 514 and 512 are formed of impermeable material, e.g., plastic or metal. In some embodiments, the swinging ledges 514 and 512 are surrounded with a gasket, or a sealing material (not shown) which seals the junction between the surface of the swinging ledges 514 and 512, and the surface of frame 530. In some embodiments, wherein the swinging ledges 514 and 512 are in close state, the gasket, or the sealing material seals the depositing device 505 from the upper surface thereof such that, frame 530 and the swinging ledges 514 and 512 form a continuous surface impermeable to water.

In some embodiments, the depositing device 505 is impermeable to water in cases wherein the swinging ledges 514 and 512 are in close state. In some embodiments, such impermeable depositing device is formed by the impermeable swinging ledges 514 and 512 surrounded with a gasket, or a sealing material and with the impermeable receptacle, for example as shown by impermeable sidewall sections 112, 122, 132 and 142 above.

Reference is made to FIG. 5B showing two cross-sectional views of a part of a depositing device, in accordance with some exemplary embodiments of the disclosed subject matter. FIG. 5B shows a cross-sectional view 505A of frame 530 comprising swinging ledges 572 and 574. The swinging ledges 572 and 574 are held in a close state by the swinging hinges 562 and 564 respectively.

In some embodiments, the swinging of the swinging ledges 572 or 574 may be due to a weight exerting a force which is above a certain swinging threshold. In some embodiments, a minimum weight of 100 gram of a cargo such as a package 549 imposed on the swinging ledge 572 and/or swinging ledge 574 may be required to exert force exceeding the swinging threshold. Thus, in case the package 549 is below swinging threshold (e.g., 100 grams) the swinging ledges 572 and 574 remain in a close state.

In some embodiments, each of the swinging ledge 572 or 574, and/or of each swinging hinges 562 and 564 may be controlled by a lock mechanism such as lock mechanisms 582A and 582B. In some embodiments, such a lock mechanism is designed to control one or more of the following functionalities: i) Lock at least one swinging hinge 562 and 564 and/or at least one swinging ledge 572 or 574 to prevent the swinging ledges 572 and/or 574 from tilting into the respectable ii) Prevent the swinging ledges 572 and/or 574 from tilting into the respectable after one event of an open state to avoid an event of depositing in the depositing device in case there is already a cargo in the depositing device (not shown). In some embodiments, this functionality of counting the number of events of open position can be reset by a person.

In some embodiments, the lock mechanisms 582A and/or 582B are connected to a controller (e.g., control system 1005) adapted for receiving the weight measuring from the bottom member (e.g., the bottom member 105B), thereby based on weight measurement values the controller unlocks the swinging ledges 572 and/or 574 which are locked otherwise. For example, in case the weight measurement value measured in the bottom member is above a weight-threshold, the controller maintains the swinging ledges 572 and/or 574 locked to avoid depositing a cargo wherein a cargo is already placed within the receptacle of the depositing device.

FIG. 5B also shows a cross-sectional view 505D of frame 561 with swinging ledges 573 and 575 connected thereto. The swinging ledges 573 and 575 are held in an open state by the swinging hinges 563 and 565 respectively. Thus, the swinging ledges 573 and 575 are tilted such that the package 543 can be inserted into the receptacle (not shown), as aforementioned. In some embodiments, lock mechanisms 583A and 583B may be integrated to the swinging ledges 573 and 575 and the swinging hinges thereof.

In some embodiments, at least one of the swinging hinges 563 and 565 may comprise a spring designed to maintain the swinging-threshold required for swinging the swinging hinges 563 and 565, thus tilting the swinging ledges 573 and 575 in case the weight of the cargo laid thereon exceeds the swinging-threshold. In some embodiments, other material and component rather than springs may be used. In some embodiments, a layer of flexible material which can bend and/or twist may replace the swinging hinges 562 and 564 and/or the springs in the swinging hinges 562 and 564.

In some embodiments, the swinging hinges 563 and 565 enable the swing movement downwards and upwards of the swinging ledges 573 and 575. The term movement downwards refers herein to the movement where the swinging ledges 573 and 575 are moving toward the bottom of the receptacle and wherein the distance between the edge 592 of the swinging ledges 573 and the edge 591 of the swinging ledges 575 increases during the movement downwards. The term movement upwards refers herein to the movement where the swinging ledges 573 and 575 are moving up toward the position of the close state, wherein the distance between the edge 592 of the swinging ledges 573 and the edge 591 of the swinging ledges 575 decreases during the movement upwards.

Figure 6:
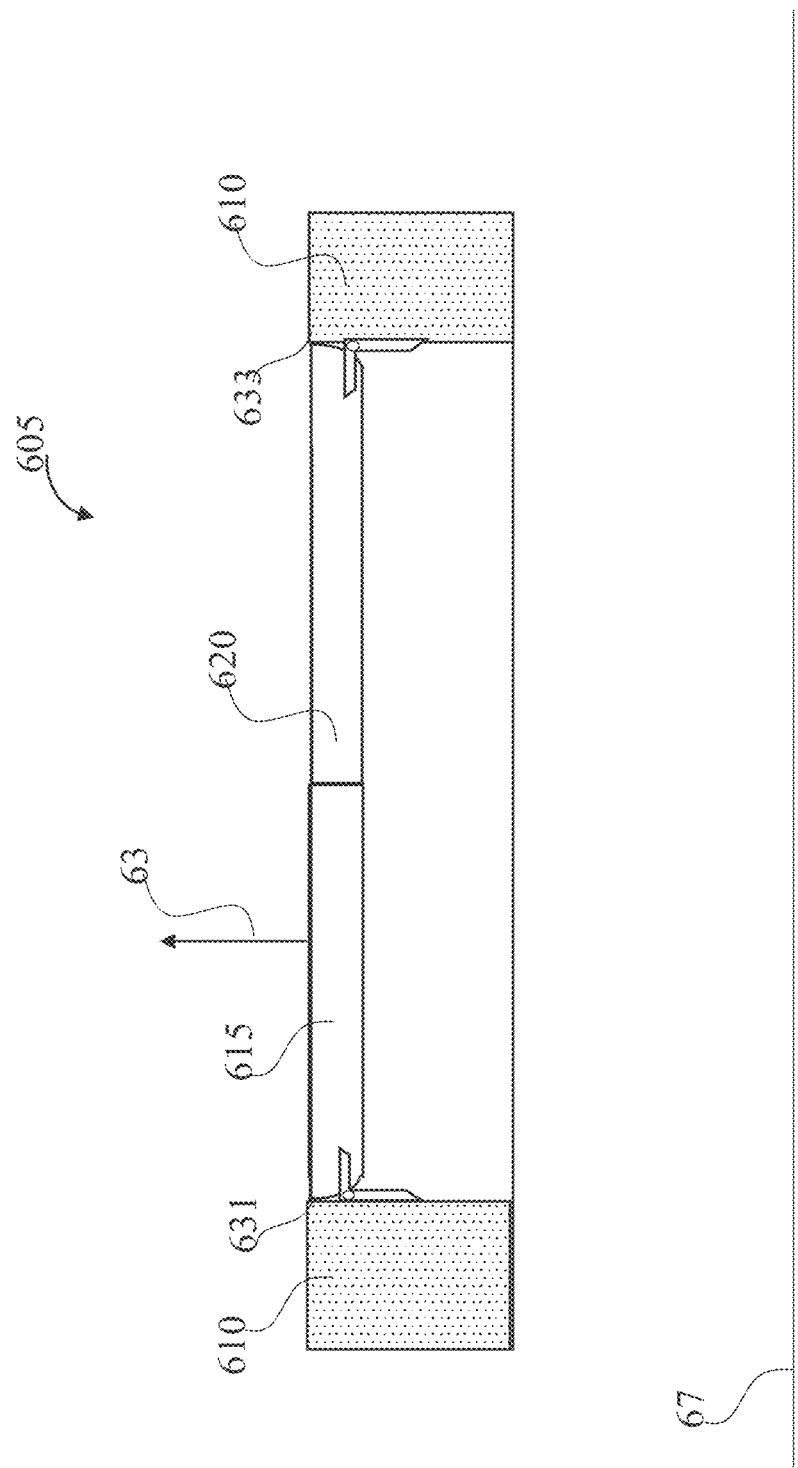
FIG. 6 shows a lateral cross-sectional view of an upper part of a depositing device comprising a frame and swinging ledges forming a continuous plane, in accordance with some exemplary embodiments of the disclosed subject matter.

Reference is made to FIG. 6 showing a lateral cross-sectional view of an upper part of a depositing device comprising a frame and swinging ledges forming a continuous plane, in accordance with some exemplary embodiments of the disclosed subject matter. FIG. 6 shows a cross-sectional view 605 of frame 610 comprising swinging ledges 615 and 620 of a depositing device (not shown).

As shown in FIG. 6 the distance between the upper surfaces facing upwards of the swinging ledges 615 and 620 and the ground marked by axis 67 is essential equal to the distance between the upper surfaces facing upwards of frame 610 and the ground marked by axis 67. As shown, the outer surfaces of swinging ledges 615 and 620, and frame 610 facing the direction pointed by arrow 63.

In some embodiments, a continuous plane is formed by the swinging ledges 615 and 620, and frame 610, wherein both swinging ledges are positioned at the same distance to the ground. In some embodiments, the continuous plane formed by the frame 610 and the swinging ledges 615 and 620 provides a safe surface for an UAV to land. In some embodiments, the UAV and/or the components thereof can be imposed on the frame 610 and the edges of the swinging ledges 615 and 620, thereby the UAV can be positioned in a steady fashion required for detached the cargo. Thus, in some embodiments, the UAV can be positioned essentially above the swinging ledges 631 and 633 in a way that does not cause the swinging hinges to swing or rotate.

In some embodiments, the continuous plane formed by the swinging ledges 615 and 620, and frame 610 can be utilized as a landing place for UAV's. In some embodiments, the depositing device can be reconfigured in two configuration modes, a first configuration mode and a second configuration mode. In some embodiments, in the first configuration mode the swinging ledges 615 and/or 620 are configured to function as a landing place wherein the swinging ledges 615 and/or 620 are locked such that the ability to swing is disabled.

In some embodiments, in the second configuration mode swinging ledges 615 and 620 are configured to receive a cargo within the receptacle such that the swinging ledges 615 and 620 are allowed to swing for inserting a package placed thereon into the receptacle (not shown), as aforementioned.

In some embodiments, at least one of the swinging ledges 615 and 620 are controlled by one or more lock mechanisms (i.e., such as lock mechanisms 582A and 582B). In some embodiments, the lock mechanisms are configured to set at least one of the swinging ledges 615 and 620 into a first configuration mode or into a second configuration mode. In some embodiments, such a controller system (or a controller) can be i.e., a central system 1005 or some of the components thereon are adapted to be responsive to the weight measured by the swinging ledges 615 and/or 620 and in case the value of the measured weight, measured in at least one of the swinging ledges 615 or 620, is above a certain UAV-threshold, the swinging ledges 615 and/or 620 are maintained in a first configuration mode.

In one exemplary embodiment, in case at least part of a UAV, or any of the components thereof are placed or laid on the swinging ledges 615 and/or 620 and in case the weight exerted on one or more of the swinging ledges is above a certain UAV-threshold, at least one of the swinging ledges 615 and 620 can be set into the first configuration mode. In such an exemplary embodiment, in case the weight exerted on one or more of the swinging ledges is below the UAV-threshold, the swinging ledges 615 and/or 620 can be set into the second configuration mode.

In some embodiments, at least one of the swinging ledges 615 and 620, or the lock mechanisms thereof can be connected to a controller which can be responsive to the weight measured by at least one of the swinging ledges 615 or 620. In some embodiments, the controller is adapted to control at least one of the lock mechanisms thus, to set at least one of the swinging ledges 615 and 620 into a first configuration mode or into a second configuration mode.

In some embodiments, at least one of the swinging ledges 615 and 620 can be configured with one or more sensors designed to measure the weight exerting force at least one of the swinging ledges 615 and 620. In some embodiments, the weight can be measured and transferred to the controller. In some embodiments, the controller can be responsive to the sensor measuring the weight such that in case the weight measured by one or more of the sensors, is equal or above the UAV-threshold, at least one of the swinging ledges 615 and 620 can be set into a first configuration mode. In some embodiments, in case the weight measured by the sensor is below the UAV-threshold at least one of the swinging ledges 615 and 620 can be set into a second configuration mode.

Figure 7:
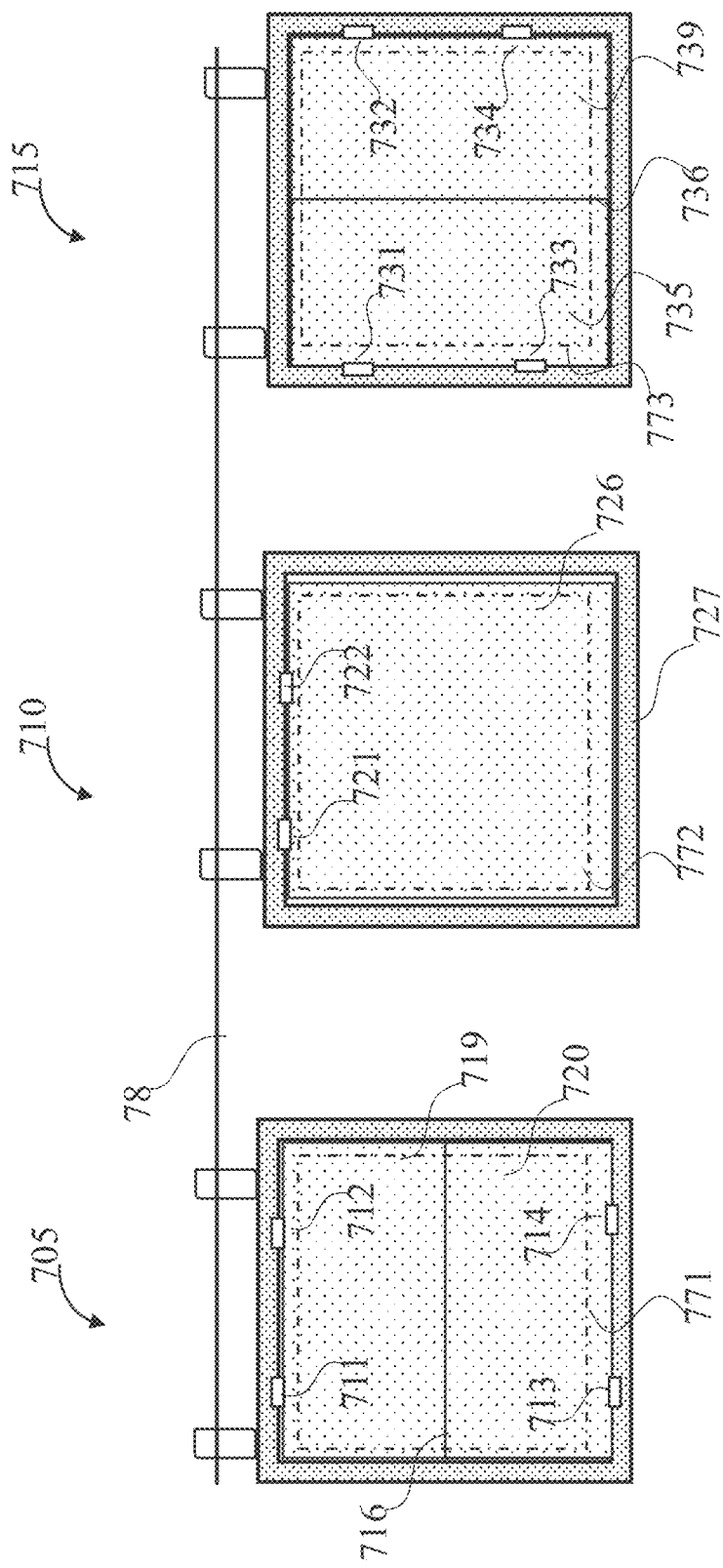
FIG. 7 schematically depicts three optional depositing devices, in accordance with some exemplary embodiments of the disclosed subject matter.

Reference is made to FIG. 7 schematically depicting three optional depositing devices, in accordance with some exemplary embodiments of the disclosed subject matter. FIG. 7 schematically depicts a depositing device 705 suspended from a balcony railing schematically represented by axis 78. Depositing device 705 comprises two swinging ledges 719 and 720 encountering in the encounter line 716, wherein the encounter line 716 is positioned essentially parallel to axis 78. The swinging ledge 719 can tilt and be in an open state through a rotation of the hinges 711, 712. The swinging ledge 720 can tilt and be in an open state through a rotation of the hinges 713 and 714.

In some embodiments, the swinging ledge 719 and the swinging ledge 720 form together a rectangle-shaped cargo-dropping area essentially residing in the surface surrounded by the imaginary line 771.

FIG. 7 also schematically depicts a depositing device 710 suspended from a balcony railing schematically represented by axis 78. The depositing device 710 comprises a single swinging ledge 726 covering the entire opening surrounded by the frame 727. The swinging ledge 726 can tilt an be in an open state through a rotation of the hinges 721 and 722.

In some embodiments, the swinging ledge 726 forms a rectangle-shaped cargo-dropping area essentially residing in the surface surrounded by the imaginary line 772.

FIG. 7 also schematically depicts a depositing device 715 suspended from a balcony railing schematically represented by axis 78. Depositing device 715 comprises two swinging ledges 735 and 739 encountering in the encounter line 736, wherein the encounter line 736 is positioned essentially vertically to axis 78. The two swinging ledges 735 and 739 can tilt and be in an open state through a rotation of the hinges 713, 732, 733, and 734.

In some embodiments, the swinging ledge 735 and the swinging ledge 739 form together a rectangle-shaped cargo-dropping area essentially residing in the surface surrounded by the imaginary line 773.

Figure 8:
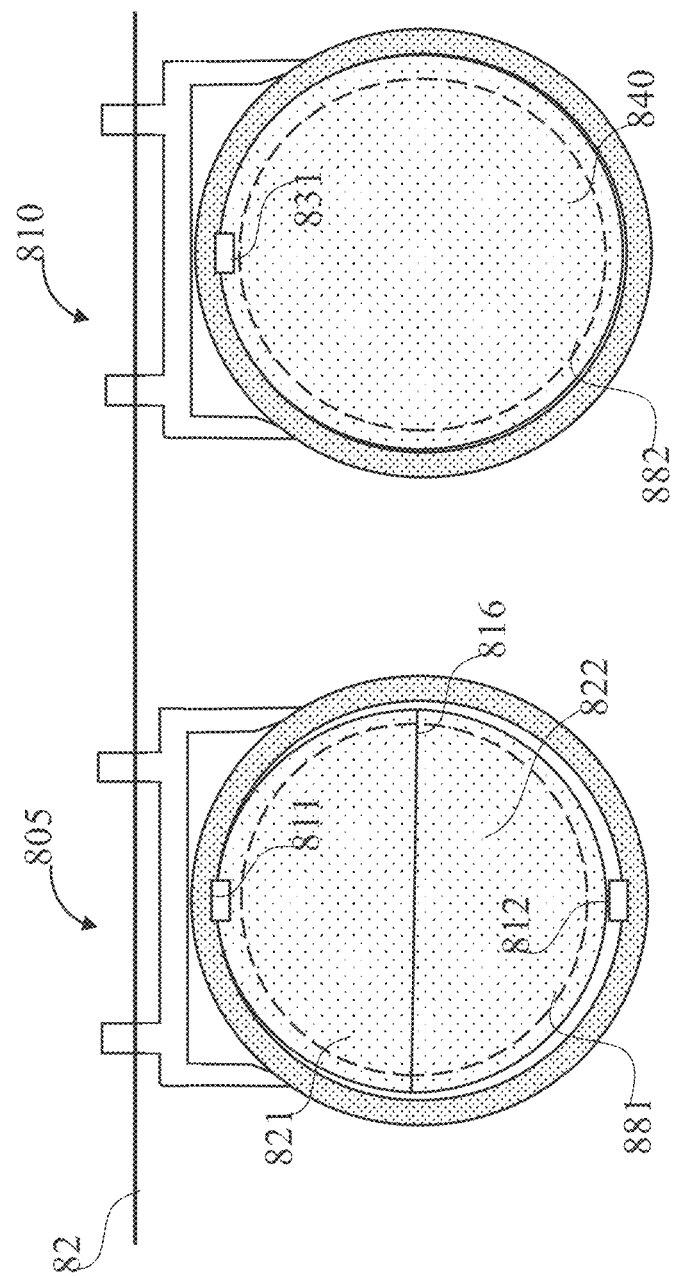
FIG. 8 schematically depicts two optional depositing devices, in accordance with some exemplary embodiments of the disclosed subject matter.

Reference is made to FIG. 8 schematically depicting two optional depositing devices, according to exemplary embodiments of the disclosed subject matter. FIG. 8 schematically depicts a round depositing device 805 suspended from a balcony railing schematically represented by axis 82.

Round depositing device 805 comprises two round swinging ledges 821 and 822 encountering in the encounter line 816, wherein the encounter line 816 is positioned essentially parallel to axis 82. The round swinging ledges 821 can tilt and be in an open state through a rotation of the hinges 811, and the round swinging ledges 822 can tilt and be in an open state through a rotation of the swinging hinges 812.

In some embodiments, the round swinging ledges 821 and the round swinging ledges 822 form together a round-shaped cargo-dropping area essentially residing in the surface surrounded by the imaginary line 881.

FIG. 8 also schematically depicts a round depositing device 810 suspended from a balcony railing schematically represented by axis 82. The round depositing device 810 comprises a round single swinging ledge 840 covering the entire opening surrounded by the frame 810. The round single swinging ledge 840 can tilt and be in an open state through a rotation of the hinge 831.

In some embodiments, the round single swinging ledge 840 forms a round-shaped cargo-dropping area essentially residing in the surface surrounded by the imaginary line 882.

Figure 9:
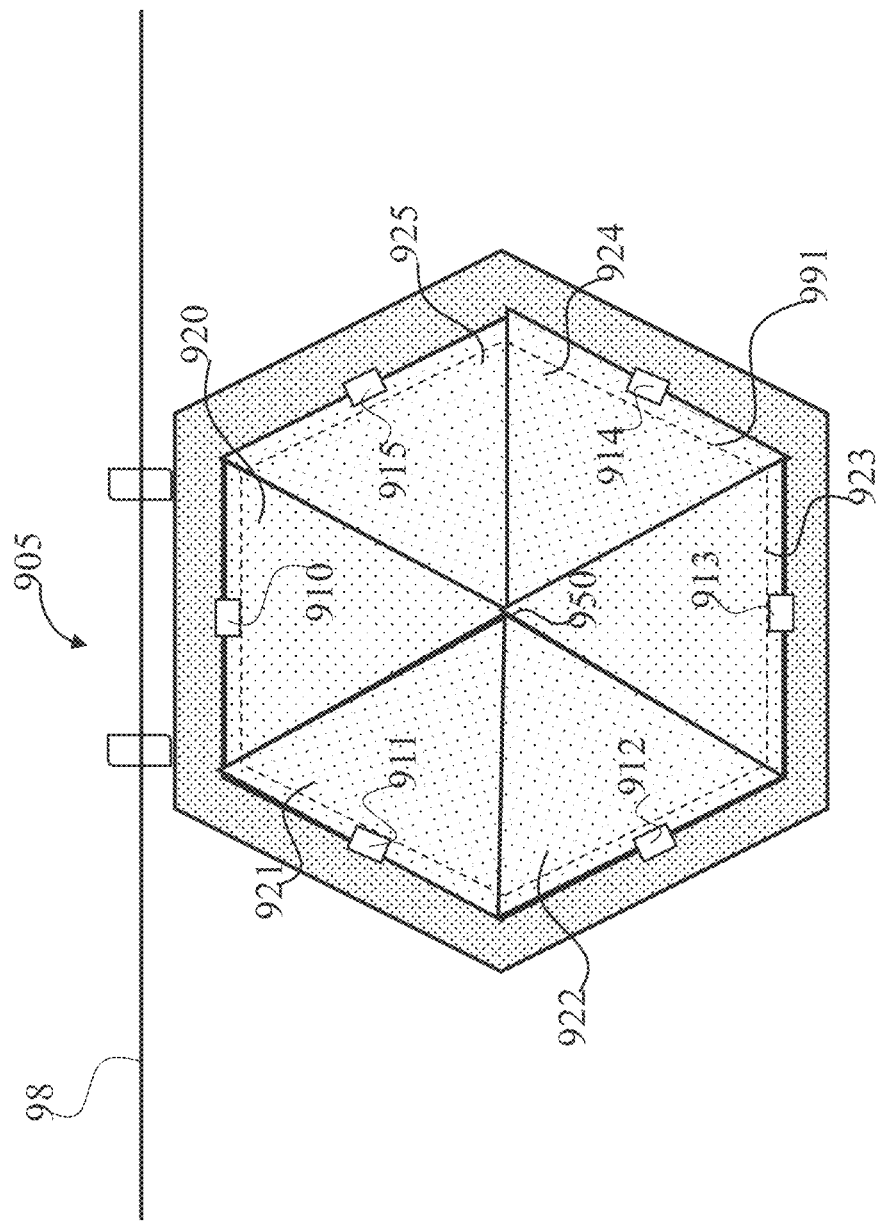
FIG. 9 schematically depicts a hexagon shaped depositing device, in accordance with some exemplary embodiments of the disclosed subject matter.

Reference is made to FIG. 9 schematically depicting a hexagon shaped depositing device, in accordance with some exemplary embodiments of the disclosed subject matter. FIG. 9 schematically depicts a hexagon shaped depositing device 905 hung to a balcony railing schematically represented by axis 98.

Depositing device 905 comprises six swinging ledges 920, 921, 922, 923, 924, and 925 encountering in the center 950 of the hexagon shaped depositing device 905. The six swinging ledges 920, 921, 922, 923, 924, and 925 can tilt and be in an open state through a rotation of the hinges 910, 911, 912, 913, 914, and 915.

In some embodiments, different number of swinging ledges and/or different number of hinges from what is disclosed herein may be implemented.

In some embodiments, the swinging ledges 920, 921, 922, 923, 924, and 925 form together a hexagon-shaped cargo-dropping area essentially residing in the surface surrounded by the imaginary line 991.

In some embodiments, the depositing device 905 can be pentagon-shaped depositing device, or with a shape of any other polygon.

Figure 10:
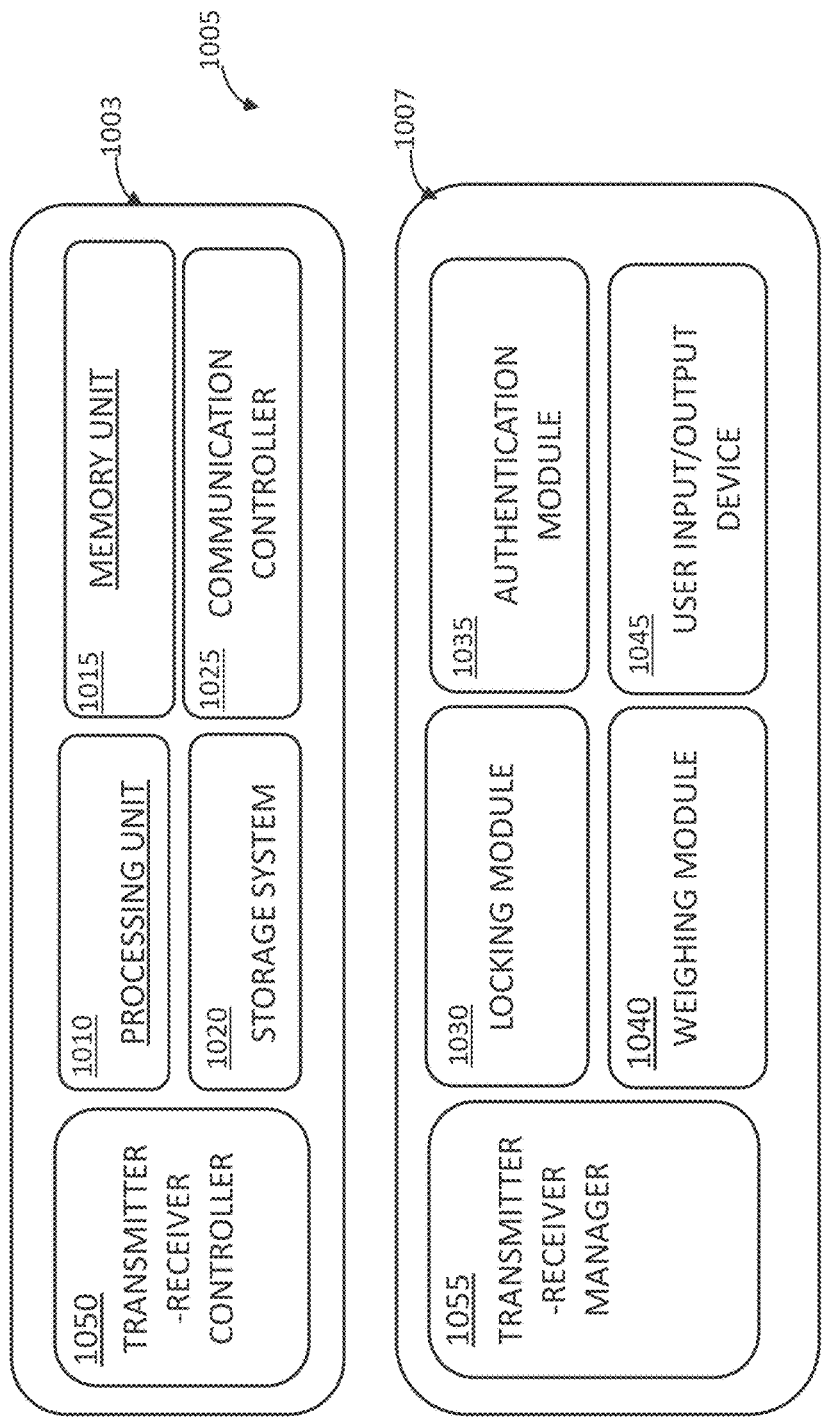
FIG. 10 schematic depicts a control system, in accordance with some exemplary embodiments of the disclosed subject matter.

Reference is made to FIG. 10 schematic depicting a control system, in accordance with some exemplary embodiments of the present disclosure. Control system 1005 (or simply controller 1005) as described herein is only an exemplary embodiment of the present invention, and in practice may have more or fewer components than shown, may combine two or more of the components, or a may have a different configuration or arrangement of the components.

The various components of central system 1005 may be implemented in hardware, software, or a combination of both hardware and software. In some embodiments, central system 1005 comprises a hardware device 1003 and a software component 1007.

In some embodiments, the hardware device 1003 may store in a non-volatile memory thereof, such as storage system 1020, software instructions or components configured to operate a processing unit (also "hardware processor," "CPU," or simply "processor"), such as processing unit 1010. In some embodiments, the hardware device 1003 may comprise one or more the software components which may include an operating system, including various software components and/or drivers for controlling and managing general system tasks (e.g., memory management, storage system control, power management, etc.) and facilitating communication between various hardware and software components.

In some embodiments, the hardware device 1003 comprises at least one or processing unit 1010, a memory unit 1015, storage system 1020, a communication controller 1025, and a transmitter-receiver controller 1050. In some embodiments, at least one or processing unit of processing unit 1010 are configured to execute computerized instructions stored in the memory unit 1015 and/or instructions stored in the storage system 1020. In some embodiments, some of such instructions are designed to send commands which can lock the locking mechanism of the swinging ledges of the depositing device, as aforementioned.

In some embodiments, the transmitter-receiver controller 1050 is configured to control the transmitter-receiver controller, e.g., the transmitting device 415. In some embodiments, the transmitter-receiver controller 1050 comprises computerized instructions, which can be executed by the processing unit 1010 for the purpose of transmitting information to a UAV. In some embodiments, such information can be data regarding the location of the transmitter communicating with a UAV. In some embodiments, the data controlled by the transmitter-receiver controller 1050 comprises one or more details regarding the geographic location of the depositing device, and of the cargo-dropping area thereof.

In some embodiments, the data controlled by the transmitter-receiver controller 1050 and sent by the transmitting device can comprise information can be used by the UAV to calibrate the UAV spatial location relative to the cargo-dropping area and thus the UAV can navigate and position the carried cargo to be above the cargo-dropping area.

In some embodiments, the transmitter-receiver controller 1050 is configured to operate authentication and/or identity validation method required for validating the UAV and/or be used by a UAV to validate the identity of the depositing device. In some embodiments, the transmitter-receiver controller 1050 can store therein a digital identify means, such as key, token, or any identification appreciated by a person having ordinary skill in the art, for validating the identity of the depositing device.

In some embodiments, the hardware device 1003 is one or more integrated circuits, e.g., a Field-programmable gate array designed to control mechanisms such as a transmitter-receiver configured for transmitting and/or receiving information from the UAV, e.g., transmitting device 415.

In some embodiments, the hardware device 1003 is mounted to the depositing device, e.g., the depositing device 100B. In some embodiments, the hardware device 1003 can be integrated with the depositing device 100B, for example, with frame 110. In some embodiments, the hardware device 1003 is a standalone device adapted to be located on the ground, or hung independently on the balcony railing. In some embodiments, the hardware device 1003 is connected via a communication transmission connector for transmitting and receiving data to and from the transmitting device, e.g., transmitting device 415.

In some embodiments, the software component 1007 can be operated by a standalone hardware unit and communicate with the hardware device 1003 via the communication controller 1025. In some embodiments, such communications can be over radio-based network, e.g., Wi-Fi. In some embodiments, the communications between the software component 1007 and the communication controller 1025 are via wired communication.

In some embodiments, the communication controller 1025 can manage the communications with various components of the depositing device. In some embodiments, the communication controller 1025 can convey the necessary commands to and/or instructions required to lock the swinging ledges. In some embodiments, the communication controller 1025 can convey the necessary commands to execute the open state.

In some embodiments, the communication controller 1025 can receive electrical signals, from the depositing device, conveying data regarding the weight measured by the depositing device. Exemplary embodiments are configured with sensors designed to measure the weight of the cargo laying on the bottom member of the depositing device, wherein these sensors are also configured to convey electrical signals representing the pressure exerted by the weight of the cargo, to the communication controller 1025.

In some embodiments, the data conveyed to the communication controller 1025 can be used by the hardware device 1003 and at least one of the components thereof to calculate the weight out of received electrical signals, compare the calculated weight value with a swinging threshold weight value and instruct to lock the swinging ledges in case the measured weight exceeds the swinging threshold weight.

In some embodiments, the hardware device 1003 is controlled, at least in part, by the software component 1007. In some embodiments, the software component 1007 can reside and operate on the hardware device 1003. For example, the software component 1007 and the components thereof can be stored in the storage system 1020 and executed by the processing unit 1010.

In some embodiments, the software component 1007 comprises a transition-receiver manger 1055, a locking module 1030, a weight module 1040, an authentication module and a user input/output device 1045.

The software component 1007, according to an aspect of the present disclosure, can be employed on a plurality of different computing devices including but not limited to personal computers and mobile devices such as phones, personal digital assistants (PDAs), and the like.

In some embodiments, software component 1007 is operated on a computer, or a server implementing computing methods, or a computerized device which can function as both, (i) a controlling device configured to receive the data and information from the hardware device 1003, and (ii) a user interface device configured to present information and data for a user, and receive additional commands and instructions for operating the depositing device.

In some embodiments, the software component 1007 comprises controls and software interfaces which can be presented to a user operating the software component 1007. In some embodiments, such controls and software interfaces are used to control the hardware unit 1003, the data stored thereon, e.g., determine the swinging threshold weight or lock or unlock the at least one of the swinging ledges, change the authentication methods or the identity means, configure the geographical area of the depositing device, and the like.

The term "computerized device" used herein refers to any computerized device designed to communicate with other computerized devices designed to be carried and operated, typically by a person. Computerized devices, such as mobile device, mobile telephones, and/or handheld computer which can be a computing device small enough to be held and operated in the hand. The computerized device is designed to employ diverse technologies allowing a user to simultaneously carry, and operate the computerized device. Operating the computerized device can be a process comprising communicating with other devices located in another geographical area, telephoning/calling other devices, exchanging messages between devices, e.g., text messages, sending notes, sending media files, and the like.

In some embodiments, software component 1007 operates on a mobile telephone configured to carry out multiple tasks in the context of mobile computing and/or mobile telephone device. In some embodiments, software component 1007 operates on a portable computerized device, e.g., a laptop PC, a tablet PC, and the like.

In some embodiments, the transition-receiver manger 1055 comprises computerized instructions, which can be executed by the processing unit 1010 for the purpose of controlling the transmitting-receiving controller 1050 as aforementioned. In some embodiments, the transition-receiver manger 1055 comprises one or more software components used by a user for changing the authentication method, the identity means, and/or the data sent by a transmitting device, e.g., the transmitting device 415.

In some embodiments, the authentication module 1035 can be used to store and manage one or more authentication methods, and/or one or more identity means of the depositing device. In some embodiments, the authentication module 1035 comprises one or more algorithm or methods for controlling the authentication process with the UAV.

In some embodiments, the central system 1005 and some of the components thereof may be configured to operate the required hardware and software components for the purpose of communicating over telephone networks, e.g., Global System for Mobile Communications (GSM). Thus, in some embodiments, the communication controller 1025 is designed to communicate over GSM with the software component 1007 (e.g., with the user input/output device 1045). In some embodiments, the communication controller 1025 can connect with the UAV over GSM thereby conduct the authentication process.

In some embodiments, the communication controller 1025 can be configured to facilitate the communication of the hardware device 1003 by operating one or more communication types, technologies or methods, designed to communicate with multiple devices and parties operating over communication networks.

In some embodiments, the communication controller 1025 can be configured to operate one or more methods or technologies to conduct the communications, based at least in part on wireless communication, e.g., Wi-Fi.

In some embodiments, the communication controller 1025 can facilitate communication with the UAV, and present the geographical location of the depositing device, the location of the cargo-dropping area, the location of the transmitting device, relative to the cargo-dropping area, and the like. In some embodiments, the communication controller 1025 be controlled and or managed by a user operating the software component 1007 and/or some of the components thereof.

In some embodiments, the weight module 1040 is used, e.g., by a user to control and receive information regards the weight being measured by the hardware device 1003 and/or the components thereof. In some embodiments, the weight module 1040 can communicate with the weight module 1040 for the purpose changing the weight-thresholds, to receive information about the measured weight, and the like.

In some embodiments, the locking module 1030 is used, e.g., by a user, to lock and unlock at least one of the swinging ledges of the depositing device. In some embodiments, the locking module 1030 can be configured with the required commands and protocols to change the computerized instructions residing in the storage system 1020, or the memory unit 1015, thus lock or unlock the swinging ledges.

In some embodiments, the locking module 1030 is used to prevent at least one swinging ledge from tilting after one time of tilting inwardly thereby prevent inserting further cargo after one time of inserting the cargo into the receptacle, wherein the lock mechanism can be reset and restart the counting.

In some embodiments, the software component 1007 may be connected to a display device for the purpose of showing a user the data received from the hardware device 1003. In some embodiments, the display device is an integral device such as a screen of a mobile telephone. In some embodiments, the display device is a standalone device communicating with the software component 1007 and at least one of the components thereof.

Figure 11A:
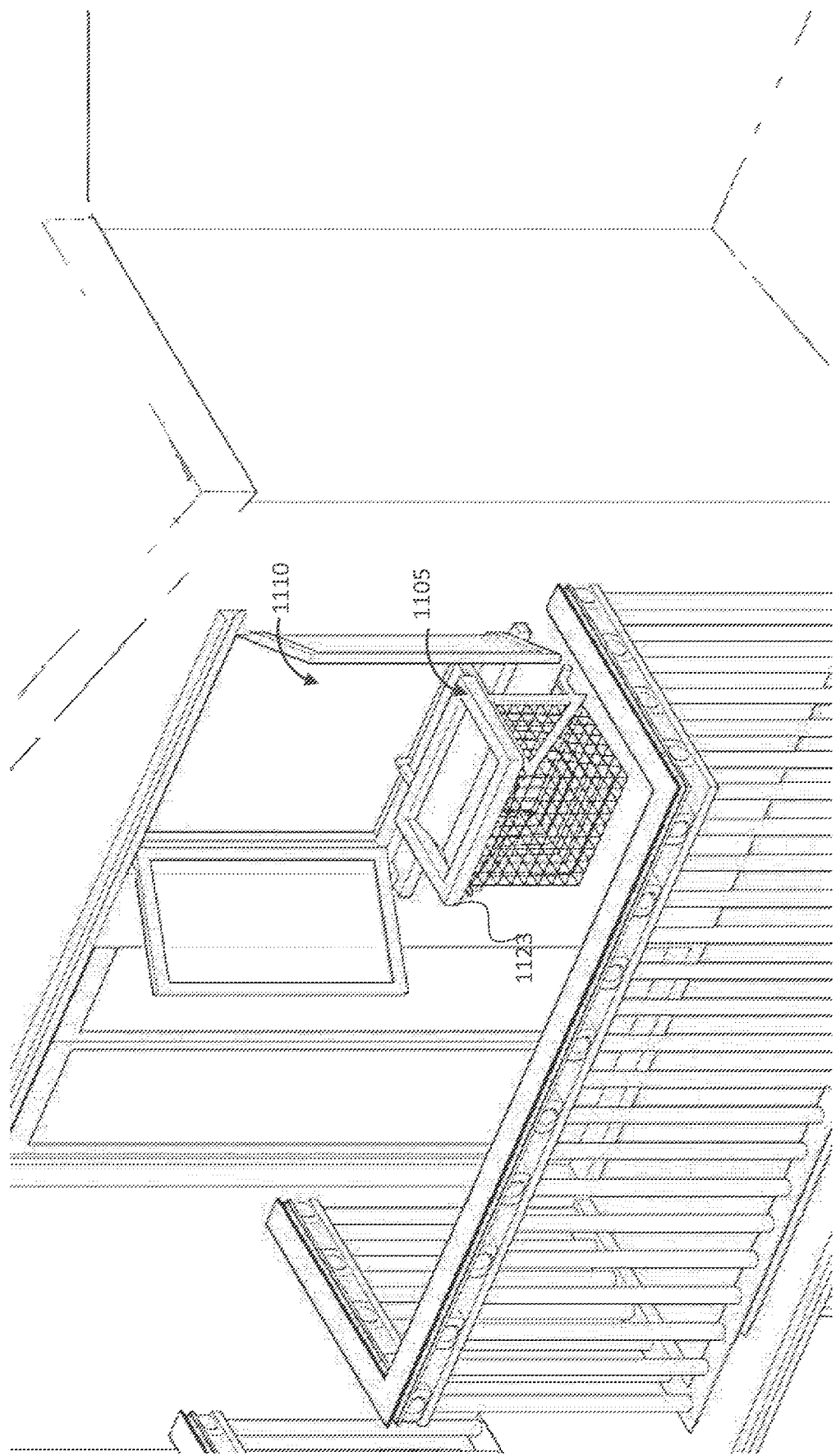

References are made to FIGS. 11A-11E showing a depositing device suspended from a window, in accordance with some exemplary embodiments of the disclosed subject matter. FIG. 11A shows a depositing device 1105 suspended from a window 1110. In some embodiments, the depositing device 1105 is hung in a stable and steady fashion allowing a UAV to locate the cargo-dropping area residing on the top of the swinging ledges, and land on the depositing device 1105. In some embodiments, the depositing device 1105 is hung steadily for allowing a UAV to land, on at least part of the frame 1123.

FIG. 11B shows a depositing device 1121 hung on a window 1113 by the hanging structure 1128 and hanging structure 1129. The depositing device 1121 extends out from the window 1113 in a fashion maintaining the required distance allowing a UAV to approach the depositing device 1121 for the purpose of placing a cargo on the depositing device 112, as aforementioned.

Figure 11C:
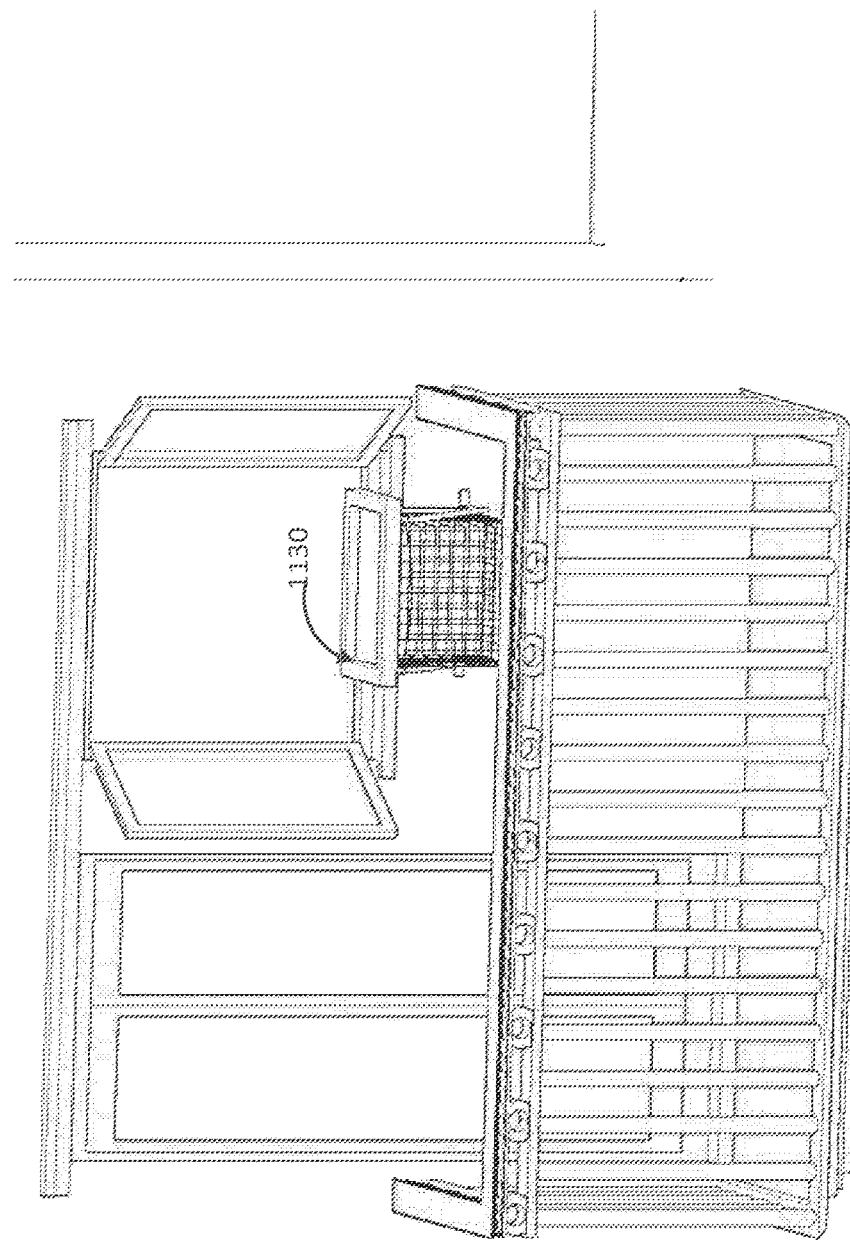

FIG. 11C shows a depositing device 1130 hung on a window and faces out to the open air. FIG. 11D shows an upper view of a depositing device 1140.

Figure 11E:
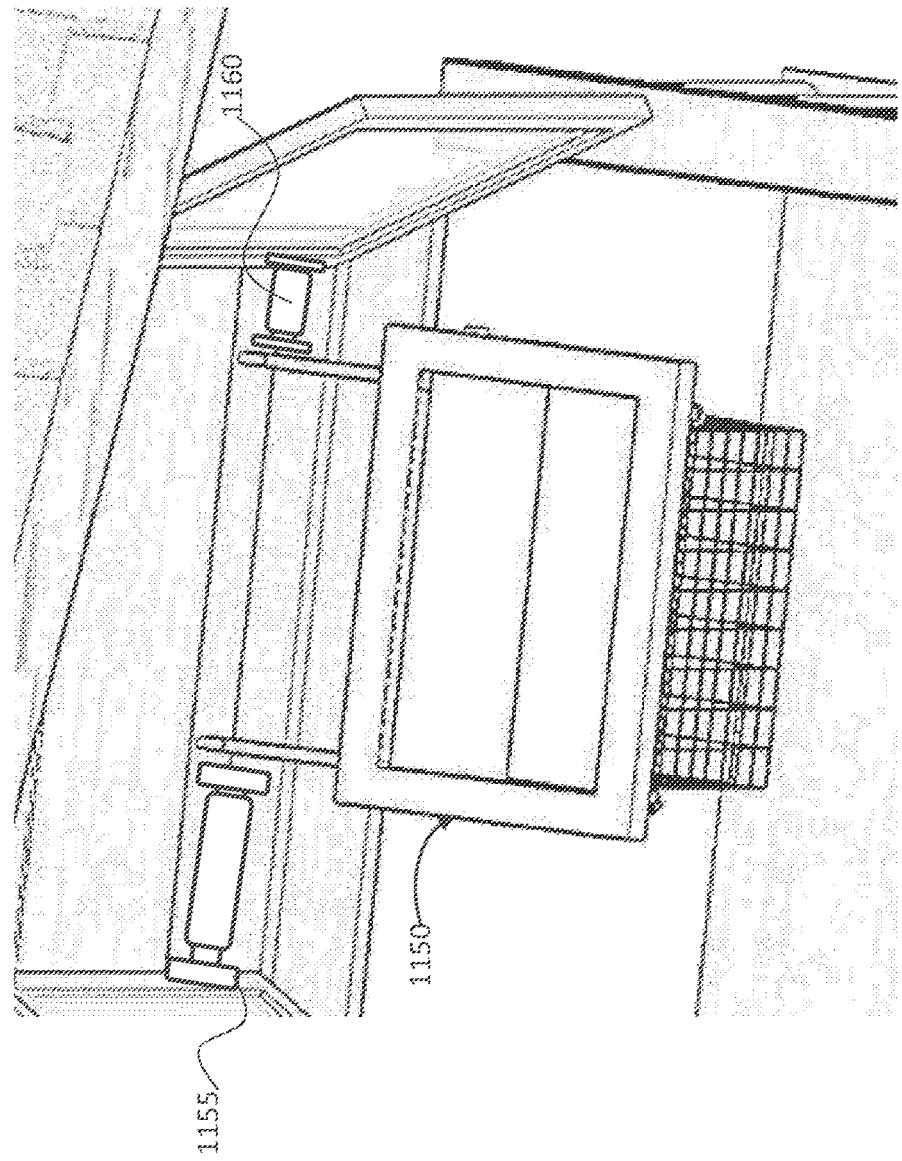

FIG. 11E shows a depositing device 1150 hung on a window. The depositing device 1150 is attached to rod 1155 and rod 1160 anchoring the hung depositing device 1150 and serve the stability of the depositing device 1150 required by the UAV for the purpose of determining the location and position of the depositing device 1150, dropping the cargo and/or landing on the depositing device 1150.

In some embodiments, at least one of the rods 1155 and 1160 is a tension rod designed to exert pressure on the window and on the depositing device 1150. In some embodiments, at least one of the rods 1155 and 1160 exerts pressure on the hanging structure such that the depositing device 1150 has no leeway for any motion. In some embodiments, at least one of the rods 1155 and 1160 is a telescopic tension rod, or a spring telescopic tension rod allowing to increase the pressure exerted by the rod.

References are made to FIGS. 12A-12B schematically depicting cargo-dropping area covered with solar panels, in accordance with some exemplary embodiments of the disclosed subject matter. FIG. 12A shows cargo-dropping area 1201 adapted to also function as a solar panel adapted to use sunlight as a source of energy to generate direct current electricity. In some embodiments, this current electricity can be used a collection of photo-voltaic (PV) modules.

The cargo-dropping area 1201 comprises PV panels PV panel 23, panel 22, panel 23, and panel 24, each of which comprises multiple photo voltaic cells. FIG. 12A also shows also shows a cross-sectional view of frame 1255 with swinging ledges 1233 and 1231 connected thereto. In some embodiments, the swinging ledges 1233 and 1231 can fold upwardly and thereby to allow a cargo to enter into the deposit device (not shown).

In some embodiments, the swinging ledges 1233 and 1231 is configured to convert solar light or electrical light to electricity. In some embodiments, this electricity can be used to activate the swinging ledges 1233 and 1231 upwardly. In some embodiments, an engine or a motor for folding the swinging ledges 1233 and 1231 upwardly.

FIG. 12B shows cargo-dropping area 1250 comprising swinging ledges 1233 and 1231 and designed to fold up, as aforementioned. In some embodiments, at least one of the swinging ledges 1233 and 1231 comprises a sensor adapted to measure the weight on the top of the at least one of the swinging ledges 1233 and 1231 and upon detecting weigh, to utilize a motor (not shown) for folding as aforementioned for the purpose of folding the cargo-dropping area 1250.

Figure 13:
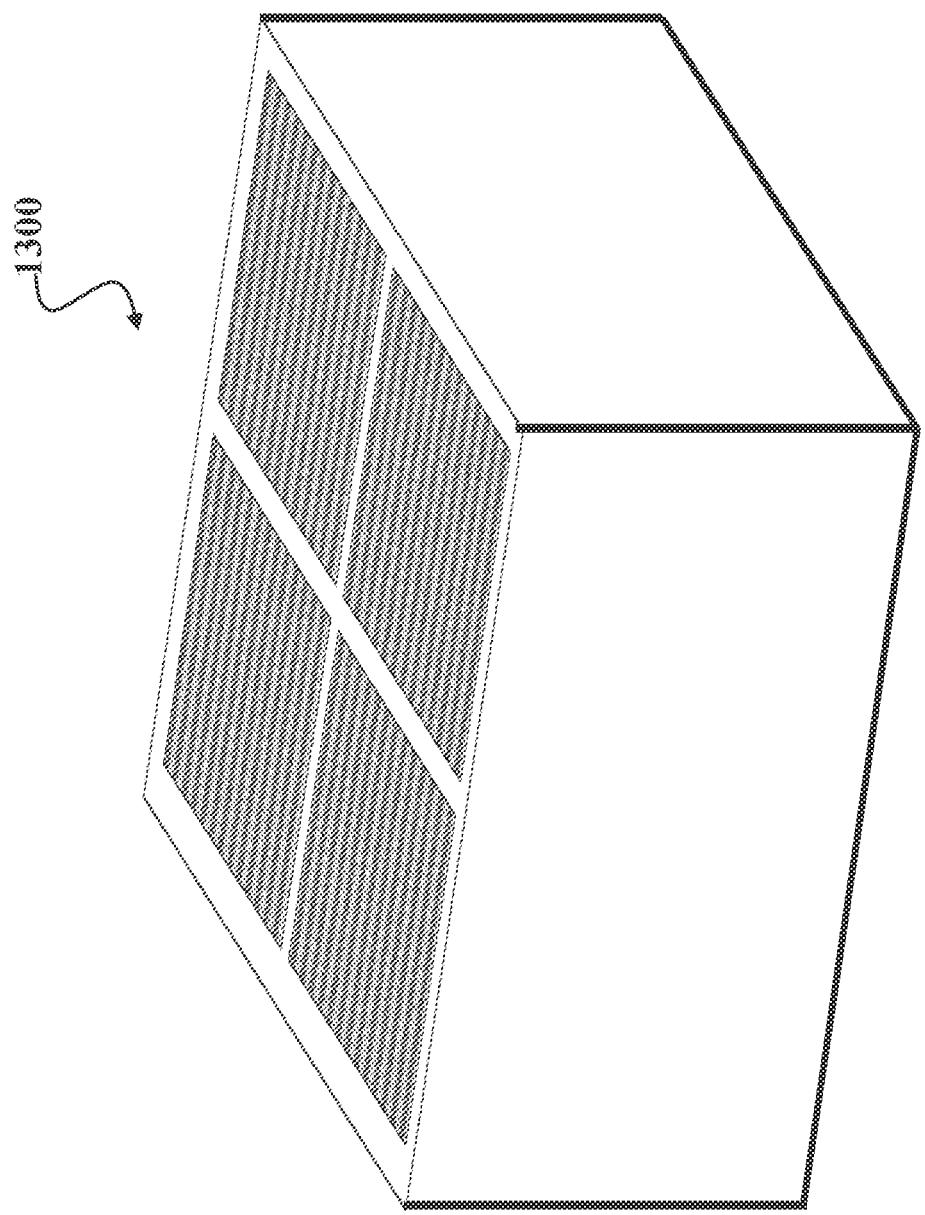
FIG. 13 depicts a depositing device with a solar panel, in accordance with some exemplary embodiments of the disclosed subject matter.

References are made to FIG. 13 depicting a depositing device with a solar panel, in accordance with some exemplary embodiments of the disclosed subject matter. FIG. 13 depicts a depositing device with a lid 1300 comprising solar panel, or photo-voltaic (PV) module, which is an assembly of photo-voltaic cells.

The computer storage utilized in the present invention can be a readable storage medium that can retain and store instructions for use ban instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to illustrations, block diagrams, and/or apparatus (systems), and computer program products according to embodiments of the invention. It will be understood that each block of the illustrations and/or diagrams, and combinations of the illustrations and/or diagrams, can be implemented by computer readable program instructions.

These computer readable program block diagrams may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the illustrations and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the disclosed herein.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the illustrations and/or block diagram block or blocks.

The illustrations and block diagrams in the Figures illustrate the architecture, functionality, and operation of possible implementations of systems, methods, and computer program products according to various embodiments of the present invention. In this regard, each block in the block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or illustrations, and combinations of blocks in the block diagrams and/or illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The diagrams and the drawing shown in the Figures illustrate the architecture, functionality, and operation of possible implementations of the devices, mechanisms, gadgets and tools according to various embodiments of the present invention. In this regard, the deposit device can be at different sizes and scales defined according to one specific embodiment out of multiple possible embodiments.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

What is claimed is:

1. A depositing device for a cargo carried out by an unmanned aerial vehicle, comprising:
   a receptacle comprising a peripheral sidewall extended around a bottom member, said receptacle is enclosed from above by at least one swinging ledge forming a cargo-dropping area on an outer surface thereof, wherein the receptacle is coupled to a hanging device adapted for hanging said depositing device;
   wherein, said depositing device is connected with a controller comprising a transmitter and designed to transmit information usable by the unmanned aerial vehicle to determine a spatial position of the cargo-dropping area;
   wherein, said at least one swinging ledge is designed to tilt downwards into the receptacle for inserting said cargo into the receptacle, in case a force exerted by a weight of the cargo imposed on the cargo-dropping area exceeds a weight-threshold;
   and wherein said depositing device further comprises a lock mechanism which prevents said at least one swinging ledge from tilting after one time of tilting downwards thereby preventing inserting further cargo after counting one time of inserting the cargo into the receptacle, wherein said lock mechanism is to reset and restart the counting.

2. The device of claim 1, wherein said at least one swinging ledge is connected to said depositing device by swinging hinges enabling the tilt movement downwards and upwards of said at least one swinging ledge.

3. The device of claim 1, wherein said depositing device further comprises a weight meter integrated in the bottom member and wherein the lock mechanism prevents said at least one swinging ledge from tilting, in case weight exerted on the bottom member exceeds a weight-threshold value.

4. The device of claim 1, further comprises a frame situated on a top part of the receptacle, wherein said at least one swinging ledge is connected to said frame, and wherein said frame is adapted to be used by the unmanned aerial vehicle to land.

5. The device of claim 4, wherein said at least one swinging ledge is connected to said frame via swing hinges.

6. The device of claim 4, wherein said frame and said at least one swinging ledge create a continuous plane enabling the unmanned aerial vehicle to be positioned in a steady fashion required for detaching the cargo.

7. The device of claim 1, wherein the information transmitted by the transmitter further comprises information indicating the identity of the depositing device.

8. The device of claim 1, wherein the transmitter further comprises a receiver designed to validate the identity of the unmanned aerial vehicle.

9. The device of claim 1, wherein the depositing device is identified by the unmanned aerial vehicle by an ID transmitted to the unmanned aerial vehicle by the transmitter for the purpose of being identified.

10. The device of claim 1, wherein the at least one swinging ledge is locked in case identity validation of the unmanned aerial vehicle fails.

11. The device of claim 1, wherein said controller is adapted for receiving authentication requests, thereby based on an identify successful validation process conducted by the controller, said controller unlocks the at least one swinging ledge after said process.

12. The device of claim 1, wherein the at least one swinging ledge is tilted upwardly in case a cargo is landed thereon.

13. The device of claim 1 wherein, the at least one swinging ledge comprises solar panels.

14. The device of claim 13 wherein, the solar panels are adapted to produce electricity.

15. The device of claim 14 wherein, the electricity produced by the solar panels is utilized for tilting upward and downward the at least one swinging ledge, and wherein, tilting the at least one swinging ledge is done by a motor or an engine.

* * * * *